(12) United States Patent
Solem

(10) Patent No.: US 7,283,981 B2
(45) Date of Patent: Oct. 16, 2007

(54) BROWSER-BASED SYSTEM FOR ORDERING FINANCIAL PRODUCTS

(75) Inventor: Linnea Solem, Maplewood, MN (US)

(73) Assignee: Deluxe Corporation, Shoreview, MN (US)

( * ) Notice: Subject to any disclaimer, the term of this patent is extended or adjusted under 35 U.S.C. 154(b) by 499 days.

(21) Appl. No.: 10/426,899

(22) Filed: Apr. 29, 2003

(65) Prior Publication Data

US 2004/0034572 A1 Feb. 19, 2004

Related U.S. Application Data

(60) Provisional application No. 60/377,057, filed on Apr. 30, 2002.

(51) Int. Cl.
*G06Q 40/00* (2006.01)
*G06Q 30/00* (2006.01)

(52) U.S. Cl. .................. 705/42; 705/14; 705/26; 705/39; 705/40

(58) Field of Classification Search .......... 705/14, 705/26, 39, 40, 42, 74
See application file for complete search history.

(56) References Cited

U.S. PATENT DOCUMENTS

| 5,873,072 A * | 2/1999 | Kight et al. ............. 705/40 |
| 2002/0065771 A1 * | 5/2002 | Dutta ........................ 705/40 |
| 2002/0091635 A1 * | 7/2002 | Dilip et al. ................ 705/39 |
| 2003/0040959 A1 * | 2/2003 | Fei et al. .................. 705/14 |
| 2003/0046229 A1 * | 3/2003 | Cresswell ................. 705/42 |
| 2003/0105709 A1 * | 6/2003 | Orlando ................... 705/39 |
| 2003/0135457 A1 * | 7/2003 | Stewart et al. ............ 705/39 |

FOREIGN PATENT DOCUMENTS

WO    WO 0049552 A2 *   8/2000

OTHER PUBLICATIONS

"Clarke American Enhances Online Reorder Application", Business Editors; Business wire; New York; Jun. 12, 2001; Clarke1(three pages);extracted from Proquest database on Internet on Feb. 13, 2007.*
"Northwest Farmers Insurance Group FCU Streamlines Check Reorder/Inquiry Process with Clarke American's ServiceLine Plus"; Business Editors; Business wire; New York; Aug. 22, 2000, hereinafter Clarke2;extracted from Proquest database on Internet on Feb. 13, 2007.*
"Deluxe Enhances Internet Personal Check Reordering Service; Service Offers More Choice and Better Value for Consumers"; PR Newswire; New York; Mar. 20, 2000, extracted from Proquest database on Feb. 13, 2007.*

(Continued)

*Primary Examiner*—Yogesh C. Garg
(74) *Attorney, Agent, or Firm*—Schwegman, Lundberg & Woessner P.A.

(57) ABSTRACT

Browser-based systems and methods are provided for ordering personalized financial products. One aspect of the present subject matter relates to a method for fulfilling financial product orders. In one embodiment of this method, a number of user inputs for selecting a number of financial products through a browser interface is received. A number of imprints is personalized using a number of personalization elements for the number of selected financial products. Special characters are supported. An order for the selected number of financial products is accepted through the browser interface. The ordered financial products are shipped. Other aspects are provided herein.

17 Claims, 32 Drawing Sheets

OTHER PUBLICATIONS

"Hughes Federal Credit Union Makes the Switch to Deluxe"; PR Newswire; New York; Jan. 7, 2002 extracted from Proquest database on Feb. 13, 2007.*

"Build Check"; IBM Technical Disclosure Bulletin, Nov. 1, 1991 vol. 34, Issue #6, p. No. 32-33, extracted from East database.*

* cited by examiner

Fig. 17

DELUXE DELUXEPORT™ SYSTEM    OAK NATIONAL™

| | TUTORIAL | HELP | EXIT |

ORDER SEARCH                USER: XX-CHAR FIELD
                            PHONE: XX-CHAR FIELD
ENTER ACCOUNT HOLDER'S ROUTING NUMBER AND ACCOUNT NUMBER.
ROUTING NUMBER:   12345678 ▼
ACCOUNT NUMBER:   [          ]

[ SEARCH ]

Fig. 18

DELUXE DELUXEPORT™ SYSTEM    OAK NATIONAL™

| ORDER SEARCH | ORDER HISTORY | SHOPPING CART | PRODUCT CATALOG | TUTORIAL | HELP | EXIT |

ORDER HISTORY

ACCOUNT INFORMATION            IMPRINT (MOST RECENT)
ROUTING NUMBER:   12345678     JANE DOE
ACCOUNT NUMBER:   1234         PH. 555-111-2222
BRANCH:           801          123 ELM ST.
DEPARTMENT:       1234         SPRINGFIELD, OH 55555
PROGRAM:          NONE         CHANGE ACCOUNT INFO
                  CHANGE PROGRAM

TO REORDER AN ITEM WITHOUT MAKING CHANGES, CHECK THE BOX NEXT TO THE ITEM(S) YOU WANT TO REORDER AND CLICK THE ADD TO CART BUTTON.
TO REORDER AN ITEM AND MAKE CHANGES, CLICK THE LINK IN THE ITEM DESCRIPTION FIELD TO MAKE MODIFICATIONS.

| REORDER | ITEM DESCRIPTION | ORDER DATE | ORDER # | QUANTITY | STATUS | SHIP DATE |
|---|---|---|---|---|---|---|
| ☐ | ANTIQUE WALLET | 12/20/1999 | ABC12345 | 1BOX-200 | SHIPPED | 12/27/1999 |
| ☐ | ANTIQUE WALLET | 06/15/1999 | XYZ38892 | 1BOX-200 | IN PROCESS | |
| ☐ | ENDORSEMENT STAMP | 06/15/1999 | XYZ38892 | 1 | SHIPPED | 06/21/1999 |
| ☐ | ANTIQUE 50 | 10/20/1998 | LEA59982 | 1BOX-50 | SHIPPED | 10/25/1998 |
| ☐ | DEPOSIT BAGS | 10/20/1997 | US065624 | 40 | SHIPPED | 10/25/1997 |

[ ADD TO CART ]
[ ORDER NEW ITEM ] [ BACK ]

IF THE ACCOUNT HOLDER NEEDS TO REORDER ITEMS NOT LISTED HERE (SUCH AS COMPUTER CHECKS), PLEASE CALL DELUXE AT 1-800-XXX-XXXX TO PLACE THE ORDER.

 

DELUXEPORT™ SYSTEM

| ORDER SEARCH | ORDER HISTORY | SHOPPING CART | PRODUCT CATALOG | TUTORIAL | HELP | EXIT |

ACCOUNT HOLDER INFORMATION
ENTER INFORMATION ABOUT THE ACCOUNT HOLDER. THE PROGRAM AFFECTS THE PRODUCTS THE ACCOUNT HOLDER CAN ORDER. THE PERSONALIZATION INFORMATION IS USED ONLY FOR PRINTING ON CHECKS AND OTHER PERSONALIZED PRODUCTS.

---ACCOUNT INFORMATION---
ROUTING NUMBER: 12345678     BRANCH #: 9999
ACCOUNT NUMBER: 1234          DEPARTMENT #: 8888
PROGRAM:        STANDARD   [ CHANGE PROGRAM ]

---PERSONALIZATION INFORMATION---
ENTER INFORMATION THAT WILL BE PRINTED ON CHECKS AND OTHER PERSONALIZED PRODUCTS. (OMIT ANY INFORMATION THAT THE ACCOUNT HOLDER DOES NOT WANT PRINTED ON THEIR CHECKS.) A MAXIMUM OF 6 LINES OF INFORMATION CAN BE PRINTED.

PERSONAL NAME 1
    PREFIX:   FIRST     MIDDLE    LAST              SUFFIX
LICENSE #:              SOC SEC #:
HOME PHONE:             WORK PHONE:            EXT.
☑ PUT THE HOME PHONE ON THE FIRST ADDRESS LINE

PERSONAL NAME 2
    PREFIX:   FIRST     MIDDLE    LAST              SUFFIX
    ☐ PUT BOTH ACCOUNT HOLDER NAMES ON THE SAME LINE
LICENSE #:              SOC SEC #:
HOME PHONE:             WORK PHONE:            EXT.

BUSINESS INFORMATION
BUSINESS NAME 1:
BUSINESS NAME 2:
BUSINESS NAME 3:

ADDRESS
ADDRESS LINE 1:
ADDRESS LINE 2:
CITY:                STATE: [---SELECT A STATE/PROVINCE---▾]  ZIP:
COUNTRY: [---SELECT A COUNTRY---▾]

SPECIAL INFORMATION TO BE PRINTED (E.G. E-MAIL ADDRESS, WEB SITE, COMPANY SLOGAN, ETC.)
LINE 1:
LINE 2:
DATE OPENED: 08/2000

[ INSERT SPECIAL CHARACTER ]  [ CONTINUE ]  [ BACK ]

*Fig. 20*

 DELUXEPORT™ SYSTEM 
| ORDER SEARCH | ORDER HISTORY | SHOPPING CART | PRODUCT CATALOG | TUTORIAL | HELP | EXIT |
INSERT SPECIAL CHARACTER
TO INSERT A SPECIAL CHARACTER IN A FIELD, SELECT THE FIELD FROM THE LIST AND CLICK ON THE SPECIAL CHARACTER.
| FIELD: | PREFIX 1 ▽ | | | | | | | | | | |
|---|---|---|---|---|---|---|---|---|---|---|---|
| SPECIAL CHARACTER: | ¢ | © | ¼ | ½ | ¾ | | | | | | |
| | À | Á | Â | Ã | Ä | Å | à | á | â | ã | ä | å |
| | Ç | ç | | | | | | | | | |
| | È | É | Ê | Ë | è | ê | é | ë | | | |
| | Ì | Í | Î | Ï | ì | í | î | ï | | | |
| | Ñ | ñ | | | | | | | | | |
| | Ò | Ó | Ô | Õ | Ö | ò | ó | ô | õ | ö | |
| | Ù | Ú | Û | Ü | ù | ú | û | ü | | | |
| | Ý | ý | ÿ | | | | | | | | |
[BACK]
*Fig.21*

| DELUXE | DELUXEPORT™ SYSTEM | | | | | OAK™ NATIONAL |
|---|---|---|---|---|---|---|
| ORDER SEARCH | ORDER HISTORY | SHOPPING CART | PRODUCT CATALOG | TUTORIAL | HELP | EXIT |

PRODUCT CATALOG

SEARCH

CHOOSE EITHER PRODUCT CODE OR DESIGN NAME, AND ENTER INFORMATION ABOUT THE PRODUCT YOU ARE TRYING TO FIND.

SEARCH BY: [PRODUCT CODE ▼]   FOR: [              ]        [SEARCH]

DEFAULT CHECKS

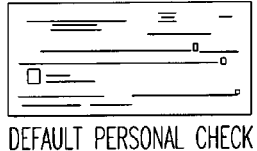
DEFAULT PERSONAL CHECK

DEFAULT BUSINESS CHECK

PRODUCTS
    CHECKS
        PERSONAL CHECKS
        HOME OFFICE DESKBOOKS
        HOME OFFICE CHECK SETS
        BUSINESS 3 ON A PAGE
        BUSINESS SINGLE CHECK SETS
        INTROPAKS

DEPOSIT TICKETS
        PERSONAL
        BUSINESS

SPECIAL ACCOUNT TYPE PRODUCTS
        HOME EQUITY
        SAVINGS
        MONEY MARKET

COVERS
        PERSONAL
        DESKBOOKS
        3 ON A PAGE
        DEPOSITS
        SINGLE CHECK POST BINDER

STAMPS
        NAME AND ADDRESS
        ENDORSEMENT
        READY-MADE

ACCESSORIES
        DEPOSIT BAGS
        DISBURSEMENT JOURNALS

NOTE: IF YOU CANNOT CLICK ON A PRODUCT, IT IS NOT AVAILABLE THROUGH THE ACCOUNT HOLDER'S CURRENT PROGRAM. SOME PRODUCTS, SUCH AS COMPUTER CHECKS, MUST BE ORDERED BY CALLING DELUXE AT 1-800-XXX-XXXX.

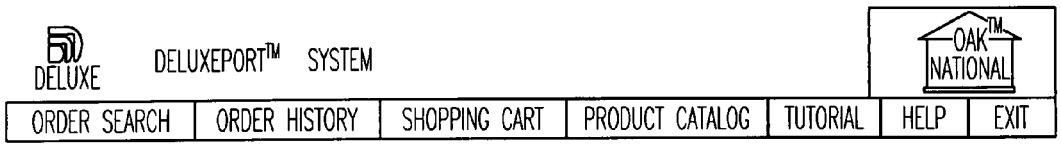

PRODUCT CATALOG : PERSONAL CHECK CATEGORIES

CHOOSE EITHER PRODUCT CODE OR DESIGN NAME, AND ENTER INFORMATION ABOUT THE PRODUCT YOU ARE TRYING TO FIND. OR, CHOOSE END STUB OR TOP STUB AND CLICK SEARCH.

SEARCH BY: [DESIGN NAME ▽]   FOR: [                ]   [SEARCH]

MAY WE SUGGEST

DEFAULT CHECK              RECOMMENDED DESIGNS

          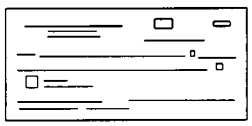              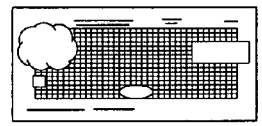

DEFAULT CHECK              A KID AT HEART                  LAURA ASHLEY

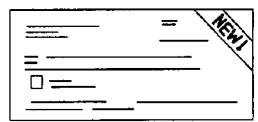

NATURE'S GARDEN

CHECK CATEGORIES

| CARTOONS AND MOVIES | NEW RELEASES | ANIMALS | GLOBAL |
| FLORAL | AMERICAN FAVORITES | SCENIC | SPORTS |
| CHILDREN | ARTISTS | BASIC | FI EXCLUSIVES |
| CHARITIES | RELIGIOUS | BASIC PLUS | INTRODUCTORY |
| SHOW ALL DESIGNS | | | |

[BACK]

*Fig. 23*

DELUXE | DELUXEPORT™ SYSTEM | OAK™ NATIONAL

| ORDER SEARCH | ORDER HISTORY | SHOPPING CART | PRODUCT CATALOG | TUTORIAL | HELP | EXIT |

PERSONAL CHECK DETAILS
USE THIS SCREEN TO CUSTOMIZE THE PRODUCT FOR THE ACCOUNT HOLDER. CLICK ADD TO CART TO PLACE THIS PRODUCT IN THE SHOPPING CART.

---ATTRIBUTES---

DESIGN: NATURE'S GARDEN  [CHANGE]  [VIEW DESIGN]
BINDING: [WALLET ($12.00) - 200 CHECKS/BOX ▽]  SUGGEST DUPLICATES FOR EASY RECORD-KEEPING.
QUANTITY: [1 BOX ▽]
STARTING #: [5001]

---IMPRINT---

PERSONALIZED IMPRINT
JANE DOE
PH. 555-111-2222
123 ELM ST.
SPRINGFIELD, OH 55555

NOTE: DEPENDING ON THE SELECTED LETTERING STYLE, THE IMPRINT MAY BE ALL CAPITAL LETTERS.

[CHANGE ACCOUNT INFO]  [CHANGE IMPRINT FORMAT]

---ENHANCEMENTS---

LETTERING
LETTERING:   SPECIAL LETTERING INCLUDED

SYMBOL/MONOGRAM
CURRENT
131

○ NONE
⦿ SYMBOL (INCLUDED)
○ MONOGRAM (INCLUDED)  [CHOOSE]

NOTE: TO SEE CHOICES, SELECT SYMBOL OR MONOGRAM AND CLICK THE CHOOSE BUTTON.

MESSAGE/SIGNATURE AREA
⦿ NONE
○ MESSAGE ($3.50):          [NONE ▽] [MORE]
○ CUSTOM MESSAGE ($3.50):   [          ]
○ ADDITIONAL SIGNATURE LINES: [0 ▽]
○ TITLE OVER SIGNATURE LINES: [          ]
○ SIGNATURE SYMBOL:         [CHOOSE]

*Fig. 24A*

SHADOW PRINT
CURRENT         NOTE: CLICK CHOOSE TO SEE YOUR SHADOW PRINT CHOICES.
         SHADOW PRINTS ARE $2.00
                [ CHOOSE ]

COVER
DESIGN:   [ BLUE VINYL (INCLUDED)          ▼ ]  [ MORE ]  [ VIEW ]

[ VIEW DESIGN ]  [ ADD TO CART ]  [ BACK ]  [ CANCEL ORDER ]

| DELUXE | DELUXEPORT™ SYSTEM | | | | | OAK NATIONAL™ |
|---|---|---|---|---|---|---|
| ORDER SEARCH | ORDER HISTORY | SHOPPING CART | PRODUCT CATALOG | TUTORIAL | HELP | EXIT |

DESIGN DETAILS

---ATTRIBUTES---

DESIGN
ANTIQUE

BINDING STYLES

| WALLET | 200 PER BOX, $12.00/BOX |
| DUPLICATE | 150 PER BOX, $15.25/BOX |
| TOP-STUB | 150 PER BOX, $15.25/BOX |

SCENES
THIS DESIGN DOES NOT INCLUDE ADDITIONAL SCENES.

WHAT'S INCLUDED
MONOGRAM OR SYMBOL AND STANDARD LETTERING INCLUDED IN PRICE. COORDINATING VINYL COVER INCLUDED WITH INITIAL ORDER.

---ENHANCEMENTS (ADDITIONAL CHARGES MAY APPLY)---

SYMBOL/MONOGRAM (INCLUDED)

 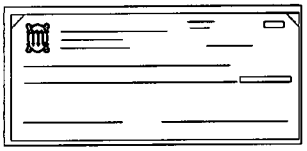

(ADDITIONAL SYMBOLS AVAILABLE.)    SYMBOL

LETTERING ($3.50)

| ARTISAN | BOOKWRIGHT | CALLIGRAPHER |
| DELEGATE | STANDARD TYPE (STANDARD TYPE IS INCLUDED.) | |

MESSAGE ($3.50)
A GOOD FRIEND IS A FRIEND FOR LIFE
SO MANY BOOKS, SO LITTLE TIME

(ADDITIONAL MESSAGE AVAILABLE.)    MESSAGE

COVER
    VINYL (INCLUDED)

*Fig. 25A*

DELUXE DELUXEPORT™ SYSTEM — OAK NATIONAL™

| ORDER SEARCH | ORDER HISTORY | SHOPPING CART | PRODUCT CATALOG | TUTORIAL | HELP | EXIT |

CHANGE IMPRINT FORMAT

YOU CAN REARRANGE THE ORDER IN WHICH THE ACCOUNT HOLDER'S INFORMATION APPEARS BY NUMBERING THE LINES FROM 1-6. IF THE STANDARD IMPRINT LINES DO NOT MEET YOUR NEEDS, YOU MAY CREATE A CUSTOM LINE.

STANDARD IMPRINT LINES

- [1] MR JAMES C MORRISON SR 08-00
- [2] MS MARY L MORRISON PHD
- [ ] JAMES C OR MARY L MORRISON
- [3] MORRISON ENTERPRISES
- [ ] WWW.MORRISON.COM
- [ ] JM@MORRISON.COM
- [ ] LIC. M123-4565-1234 M933-5883-5883
- [ ] SSN. 111-22-3333 444-33-2222
- [ ] PH. 651-555-1111 651-555-2222
- [ ] WK 612-333-4444 EXT 123 612-663-3443
- [4] 123 ELM STREET
- [ ] 123 ELM STREET, PH. 651-555-1111
- [5] P.O. BOX 1352
- [6] ROSEVILLE, MN 55113

CURRENT IMPRINT

MR JAMES C MORRISON SR 08-00
MS MARY L MORRISON PHD
MORRISON ENTERPRISES
123 ELM STREET
P.O. BOX 1352
ROSEVILLE, MN 55113

CUSTOM LINES

- [ ] MORRISON ENTERPRISES EMAIL: JM@MORRISON.COM

[REFRESH IMPRINT] [CHANGE ACCOUNT INFO] [ADD CUSTOM LINE]

[BACK] [CONTINUE]

*Fig. 27*

DELUXE | DELUXEPORT™ SYSTEM | OAK™ NATIONAL

| ORDER SEARCH | ORDER HISTORY | SHOPPING CART | PRODUCT CATALOG | TUTORIAL | HELP | EXIT |

ADD CUSTOM IMPRINT LINE
TO BUILD A CUSTOM LINE FOR THE IMPRINT, ENTER A NUMBER THAT CORRESPONDS TO THE ORDER THE INFORMATION SHOULD APPEAR ON THE LINE.
FOR EXAMPLE, IF THE LAST NAME SHOULD APPEAR ON THE LINE BEFORE THE FIRST NAME, ENTER 1 NEXT TO LAST NAME AND 2 NEXT TO FIRST NAME.
YOU CAN CHOOSE LABELS SUCH AS PH FOR PHONE, OR ENTER YOUR OWN LABELS. THERE IS A MAXIMUM OF 45 CHARACTERS PER LINE.

PERSONAL INFORMATION

PERSON 1
- [ ] MR (PREFIX)
- [ ] JAMES (FIRST)
- [ ] C (MIDDLE)
- [ ] MORRISON (LAST)
- [ ] SR (SUFFIX)
- [ ] M123-4565-1234 (LICENSE)
- [ ] 111-22-3333 (SSN)
- [ ] 651-555-1111 (HOME PHONE)
- [ ] 612-333-4444 (WORK PHONE)
- [ ] 123 (EXT)

PERSON 2
- [ ] MS (PREFIX)
- [ ] MARY (FIRST)
- [ ] L (MIDDLE)
- [ ] MORRISON (LAST)
- [ ] PH D (SUFFIX)
- [ ] M933-5883-5883 (LICENSE)
- [ ] 444-33-2222 (SSN)
- [ ] 651-555-2222 (HOME PHONE)
- [ ] 612-663-3443 (WORK PHONE)
- [ ] 456 (EXT)

BUSINESS, ADDRESS AND SPECIAL
- [ ] 08-00 (ACCOUNT OPENED)
- [1] MORRISON ENTERPRISES (BUSINESS NAME)
- [ ] WWW.MORRISON.COM (SPECIAL LINE 1)
- [3] JM@MORRISON.COM (SPECIAL LINE 2)
- [ ] 123 ELM STREET (ADDRESS 1)
- [ ] APT. 101 (ADDRESS 2)
- [ ] ROSEVILLE (CITY)
- [ ] MN (STATE)
- [ ] 55113 (ZIP)
- [ ] USA (COUNTRY)

LABELS
- [ ] PH.
- [ ] WK.
- [ ] EXT.
- [ ] SSN.
- [ ] LIC.
- [2] CUSTOM 1: [EMAIL:]
- [ ] CUSTOM 2:
- [ ] CUSTOM 3:
- [ ] CUSTOM 4:
- [ ] CUSTOM 5:

[SHOW CUSTOM LINE] [CHANGE ACCOUNT INFO]

CUSTOM LINE
MORRISON ENTERPRISES EMAIL: JM@MORRISON.COM

[CONTINUE] [BACK]

*Fig. 28*

VIEW LETTERING      PAGE 1 OF 1

 DELUXE    DELUXEPORT™ SYSTEM       OAK™ NATIONAL

| ORDER SEARCH | ORDER HISTORY | SHOPPING CART | PRODUCT CATALOG | TUTORIAL | HELP | EXIT |

LETTERING STYLES

ARTISAN [AL]      CALLIGRAPHER [CL]      DELEGATE [DL]

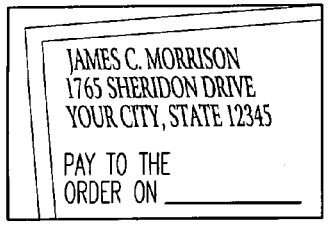 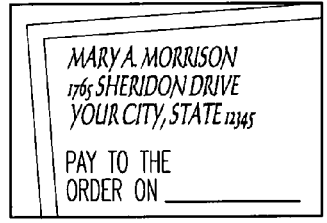 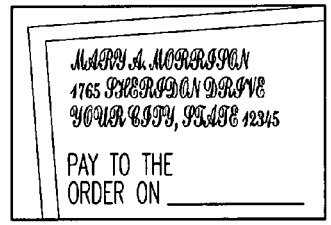

*STANDARD LETTERING      BOOKWRIGHT [BL]

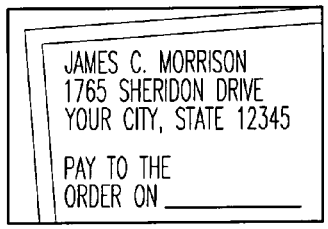 

[BACK]

 DELUXE    DELUXEPORT™ SYSTEM       OAK™ NATIONAL

| ORDER SEARCH | ORDER HISTORY | SHOPPING CART | PRODUCT CATALOG | TUTORIAL | HELP | EXIT |

SELECT MONOGRAM

SELECT LETTER: [D ▽]

STYLE A:   ⊙   𝒜   𝐵   𝒞    (ARTISAN)
STYLE B:   ○   𝔄   𝔅   ℭ    (BOOKWRIGHT)
STYLE C:   ○   𝒜   ℬ   𝒞    (CALLIGRAPHER)
STYLE D:   ○   𝒜   ℬ   𝒞    (DELEGATE)

[CONTINUE] [BACK]

*Fig. 30*

DELUXE  DELUXEPORT™ SYSTEM                                    OAK™ NATIONAL

| ORDER SEARCH | ORDER HISTORY | SHOPPING CART | PRODUCT CATALOG | TUTORIAL | HELP | EXIT |

SELECT A MESSAGE
  A GOOD FRIEND IS A FRIEND FOR LIFE     A GOOD FRIEND IS A FRIEND FOR LIFE
  SO MANY BOOKS, SO LITTLE TIME          SO MANY BOOKS, SO LITTLE TIME
MESSAGE CATEGORIES
  GARDENING                              BUSINESS
  HOBBIES                                BUGS BUNNY AND FRIENDS
  INSPIRATIONAL                          GARFIELD
  MILLENIUM                              NASCAR®
  SPORTS                                 MARTIN LUTHER KING, JR.
  MISCELLANEOUS                          STAR WARS™ COLLECTION
  NATURE                                 NOVA®
                                         FIELD AND STREAM®

[BACK]

*Fig. 31*

DELUXE  DELUXEPORT™ SYSTEM                                    OAK™ NATIONAL

| ORDER SEARCH | ORDER HISTORY | SHOPPING CART | PRODUCT CATALOG | TUTORIAL | HELP | EXIT |

SHOPPING CART
  YOU CAN CHANGE, VIEW OR DELETE AN ITEM BELOW BY CLICKING THE BUTTONS NEXT TO THE ITEM. WHEN ALL
  THE ITEMS YOU WANT TO ORDER ARE IN THE SHOPPING CART, CLICK THE CHECKOUT BUTTON. YOU WILL ENTER
  BILLING AND SHIPPING INFORMATION ON THE CHECKOUT SCREEN.

ITEM              QUANTITY        STARTING#   PRICE
ANTIQUE WALLET    [1 BOX-200 ▼]   [5001]      $  15.50     [CHANGE]
  BASE PRICE  $12.00                                       [VIEW DESIGN]
  LETTERING   $3.50                                        [DELETE ITEM]
  MONOGRAM    $0.00
                          SUBTOTAL:  $  15.50    (SUBTOTAL DOES NOT INCLUDE
                                                  SHIPPING, HANDLING OR TAX)

[RECALCULATE PRICE] [ORDER NEW ITEM] [ORDER HISTORY] [CHECKOUT] [CANCEL ORDER]

FEATURED PRODUCTS
THE ACCOUNT HOLDER MAY ALSO BE INTERESTED IN THE FOLLOWING PRODUCTS. CLICK THE NAME OF THE
PRODUCT FOR MORE DETAILS:
PERSONAL DEPOSIT TICKETS
ENDORSEMENT STAMP

*Fig. 32*

 DELUXE  DELUXEPORT™ SYSTEM  

| ORDER SEARCH | ORDER HISTORY | SHOPPING CART | PRODUCT CATALOG | TUTORIAL | HELP | EXIT |

CHECKOUT (ONE ITEM IN ORDER)
ITEM ORDERED
TO CHANGE, VIEW OR REMOVE AN ITEM, CHOOSE THE BACK BUTTON. TO CANCEL THE ENTIRE ORDER, CHOOSE THE CANCEL ORDER BUTTON.

| ITEM | QUANTITY | STARTING# | PRICE | IMPRINT |
|---|---|---|---|---|
| ANTIQUE WALLET | 1 BOX-200 | 5001 | $ 15.50 | JANE DOE |
| BASE PRICE $12.00 | | | | PH. 555-111-2222 |
| LETTERING $3.50 | | | | 123 ELM ST. |
| MONOGRAM $0.00 | | | | SPRINGFIELD, OH 55555 |
| | | SUBTOTAL: | $ 15.50 | |

BILLING
  CHARGE TO: [ACCOUNT HOLDER ▼]   REPRINT REASON: NONE

SHIPPING                                                SECURE MAIL PRICING APPLIES!
  CHARGE SHIPPING TO: [ACCOUNT HOLDER ▼]
  SHIPPING METHOD: [STANDARD ($2.50) ▼]
  SHIP TO: [ADDRESS ON PRODUCT ▼]                EXPRESS DELIVERY

SPECIAL SHIPPING ADDRESS:   *- REQUIRED FOR SPECIAL SHIPPING ADDRESS ONLY
                                      ENTER A NAME OR A BUSINESS NAME
            FIRST     MIDDLE    LAST
  NAME:* [_____] [_____] [_____]
BUSINESS NAME:* [_____]
  ATTENTION: [_____]
NOTE: EXPRESS DELIVERY CANNOT DELIVER TO P.O. BOXES
ADDRESS LINE 1:* [_____]
ADDRESS LINE 2: [_____]
  CITY:* [_____]  STATE:* [---SELECT A STATE--- ▼]  ZIP:* [_____]
  COUNTRY: [---SELECT A COUNTRY--- ▼]

[ CONTINUE ]  [ BACK ]  [ CANCEL ORDER ]

*Fig. 35*

BROWSER-BASED SYSTEM FOR ORDERING FINANCIAL PRODUCTS

CROSS REFERENCE TO RELATED APPLICATION

This application claims the benefit of U.S. Provisional Application Ser. No. 60/377,057, filed Apr. 30, 2002, under 35 U.S.C. 119(e), the specification of which is incorporated herein by reference.

TECHNICAL FIELD

This invention relates generally to a computer method and system for placing orders and, more particularly, to browser-based systems for ordering financial products.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Checks are used to draw money from an account. Banks and credit unions order checks for their customers from a check printer. Some customers are able to reorder checks directly from a check printer.

A large number of choices and a number of rules apply to the process for designing and ordering checks an other personalized financial products. These rules and these choices interact with each other. One set of rules and one subset of choices applies for one choice, and another set of rules and another subset of choices applies for another choice.

It is desired to provide a user-friendly system and method for ordering and reordering personalized financial products such as checks.

SUMMARY

The above mentioned problems are addressed by the present subject matter and will be understood by reading and studying the following specification. The present subject matter provides systems and methods for ordering and reordering personalized financial products such as checks, for example. The present subject matter provides an interactive order process that presents viable personalization options to a user based on a number of rules for designing and ordering financial products and based on other customer-selected choices in the order process.

In one embodiment, the present subject matter provides systems and methods to capture personalization information for personalized financial products. According to various embodiments, the present subject matter gathers information required to personalize new orders, leverages order history information to accurately display the personalization from previous orders, and/or displays the personalization in an appropriate format for the product. A customer is presented with a proposed, viable personalization option. The customer is provided an opportunity to make some formatting and imprinting decisions to the proposed personalization option. Thus, the present subject matter submits valid and accurate personalization information with the new orders.

One aspect of the present subject matter relates to a method for fulfilling financial product orders. A number of user inputs for selecting a financial product are received through a browser interface. An imprint for the selected financial product is personalized. A proposed imprint is constructed using personalization element data and formatting rules for the financial product. The proposed imprint is displayed through the browser interface. User inputs for modifying the proposed imprint are received through the browser interface. The formatting rules for the financial product are enforced to construct a revised proposed imprint. An order for the selected number of financial products is accepted, and the ordered financial products are shipped.

In one embodiment of this method, a number of user inputs for selecting a number of financial products through a browser interface is received. Imprints are personalized using a number of personalization elements for the number of selected financial products. Special characters are supported in these personalization elements to assist with pronunciations of names, for example. An order for the selected number of financial products is accepted through the browser interface, and the ordered financial products are shipped.

In one embodiment, the present subject matter provides systems and methods to provide an on-line catalog featuring standard products and products that are exclusive to a Financial Institution (FI) or a particular program offered by the FI. One example of a program that may be offered by an FI is a checking account for senior citizens. There are certain benefits and product offerings associated with these programs that are marketed to the program members. According to various embodiments, the present subject matter limits an on-line offering to products that are in scope with the program, customizes an on-line catalog on behalf of the FI and/or allows the user to select only valid products for a given routing number and program. In various embodiments, the present subject matter supports flexibility at the FI level, the routing number level and at the program level, supports consumers that are not part of a formal FI program, and promotes flexibility across market segments (Mega/Regional, community Bank, Credit Union) where different product offerings are required. Thus, the present subject matter provides a reliable and cost effective means of ordering products.

In one embodiment, a number of user inputs for selecting a number of financial products is received through a browser interface. An account number and a routing number are received. A program associated with the account number and the routing number is identified. In one embodiment, a FI representative selects the appropriate program. In another embodiment, the program is identified from information previously provided by the FI. Program rules for the identified program are applied to provide financial product content specific for the identified program. User-selected financial products that are to be personalized are identified, and a number of imprints for the selected financial products are personalized. An order for the selected number of financial products is accepted, and the ordered financial products are shipped.

In one embodiment, the present subject matter provides systems and methods to provide business rules that relate to where the product is shipped. The present subject matter enforces business rules that are dependent on other order capture/submission elements. Viable shipping choices depend on a combination of order attributes (such as product type, program name, and account holder information, for example), mailing destination, and shipping method.

In one embodiment, user inputs for selecting a number of financial products are received through a browser interface. Both an account number and a routing number are received. Imprints for a number of selected financial products are personalized. An order for the selected financial products is accepted, and the ordered financial products are shipped according to shipping rules based on account attributes, financial product attributes and/or program attributes.

These and other aspects, embodiments, advantages, and features will become apparent from the following description of the invention and the referenced drawings.

BRIEF DESCRIPTION OF THE DRAWINGS

FIG. 17 illustrates one embodiment of a screen display for the browser-based system of FIG. 1 used to search for an existing financial product order.

FIG. 18 illustrates a screen display for the browser-based system of FIG. 1 used to review past orders and to reorder financial products.

FIG. 20 illustrates one embodiment of a screen display for the browser-based system of FIG. 1 used to enter and/or review account holder information, including personalization elements for the account holder.

FIG. 21 illustrates one embodiment of a screen display for the browser-based system of FIG. 1 used to insert special characters in personalization elements for the account holder.

FIG. 22 illustrates one embodiment of a screen display for the browser-based system of FIG. 1 used to search for financial products in a product catalog.

FIG. 23 illustrates one embodiment of a screen display for the browser-based system of FIG. 1 used to search for products in a product catalog when the personal checks link is selected in FIG. 22.

FIGS. 24A and 24B illustrate one embodiment of a screen display for the browser-based system of FIG. 1 used to review and modify a personal check product.

FIGS. 25A and 25B illustrate one embodiment of a screen display for the browser-based system of FIG. 1 used to review and change design details for a personal check product.

FIG. 27 illustrates one embodiment of a screen display for the browser-based system of FIG. 1 used to review and change the format of a proposed personalized imprint.

FIG. 28 illustrates one embodiment of a screen display for the browser-based system of FIG. 1 used to add custom lines to a personalized imprint.

FIG. 29 illustrates one embodiment of a screen display for the browser-based system of FIG. 1 used to select a lettering style for the personalized imprint.

FIG. 30 illustrates one embodiment of a screen display for the browser-based system of FIG. 1 used to select a monogram for the personalized imprint.

FIG. 31 illustrates one embodiment of a screen display for the browser-based system of FIG. 1 used to select a message for the personalized imprint.

FIG. 32 illustrates one embodiment of a shopping cart screen display for the browser-based system of FIG. 1 used to collect selected products for review prior to order.

FIG. 35 illustrates one embodiment of a checkout screen display for the browser-based system of FIG. 1 used to review and change order and shipping information prior to submission of the financial product order.

DETAILED DESCRIPTION

Figure 1:
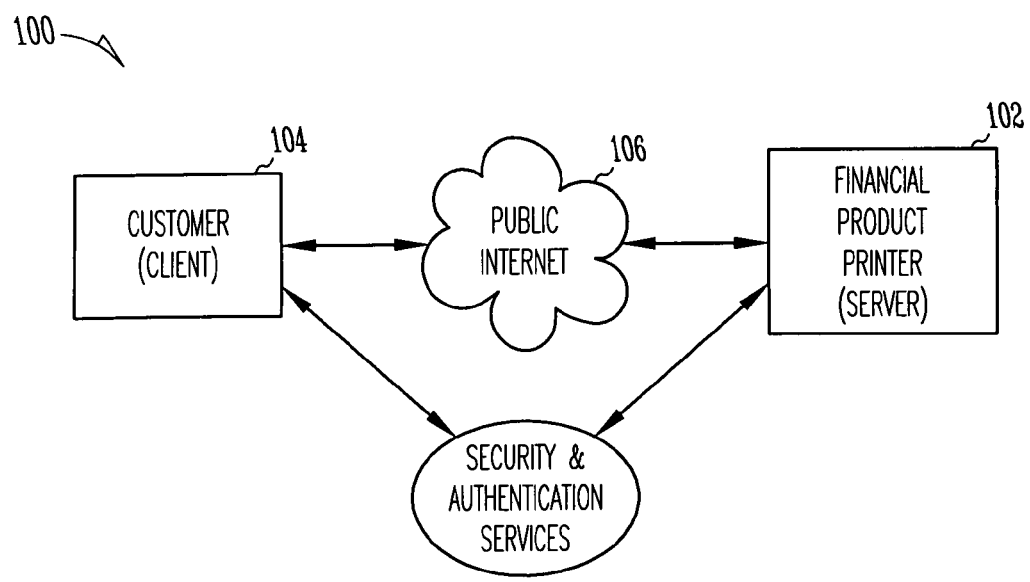
FIG. 1 illustrates one embodiment of a browser-based system for ordering financial products.

The following detailed description refers to the accompanying drawings which show, by way of illustration, specific aspects and embodiments in which the present subject matter may be practiced. In the drawings, like numerals describe substantially similar components throughout the several views. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

FIG. 1 illustrates one embodiment of a browser-based system for ordering financial products. The illustrated system 100 includes a server 102 at a first location and a browser-based client 104 at a second location. The client 104 communicates with the server 102. In one embodiment, the server 102 and client 104 communicate through the public Internet, illustrated as a network cloud at 106. Although only one client 104 and one server 102 are shown, one of ordinary skill in the art will appreciate that the system 100 is able to incorporate a number of clients and a number of servers. Security and authentication services, illustrated at 108, are used to secure the communication between the server 102 and the client 104. Examples of security services include, but are not limited to, firewalls and digital certificates.

In one embodiment, the client 104, illustrated at a customer location, is used to place orders for financial products. In one embodiment, the server 102 is located at or otherwise in communication with a financial product printer location such that the server is capable of receiving the financial product order and providing information to the financial product printer to fulfill the financial product order.

Figure 2A:
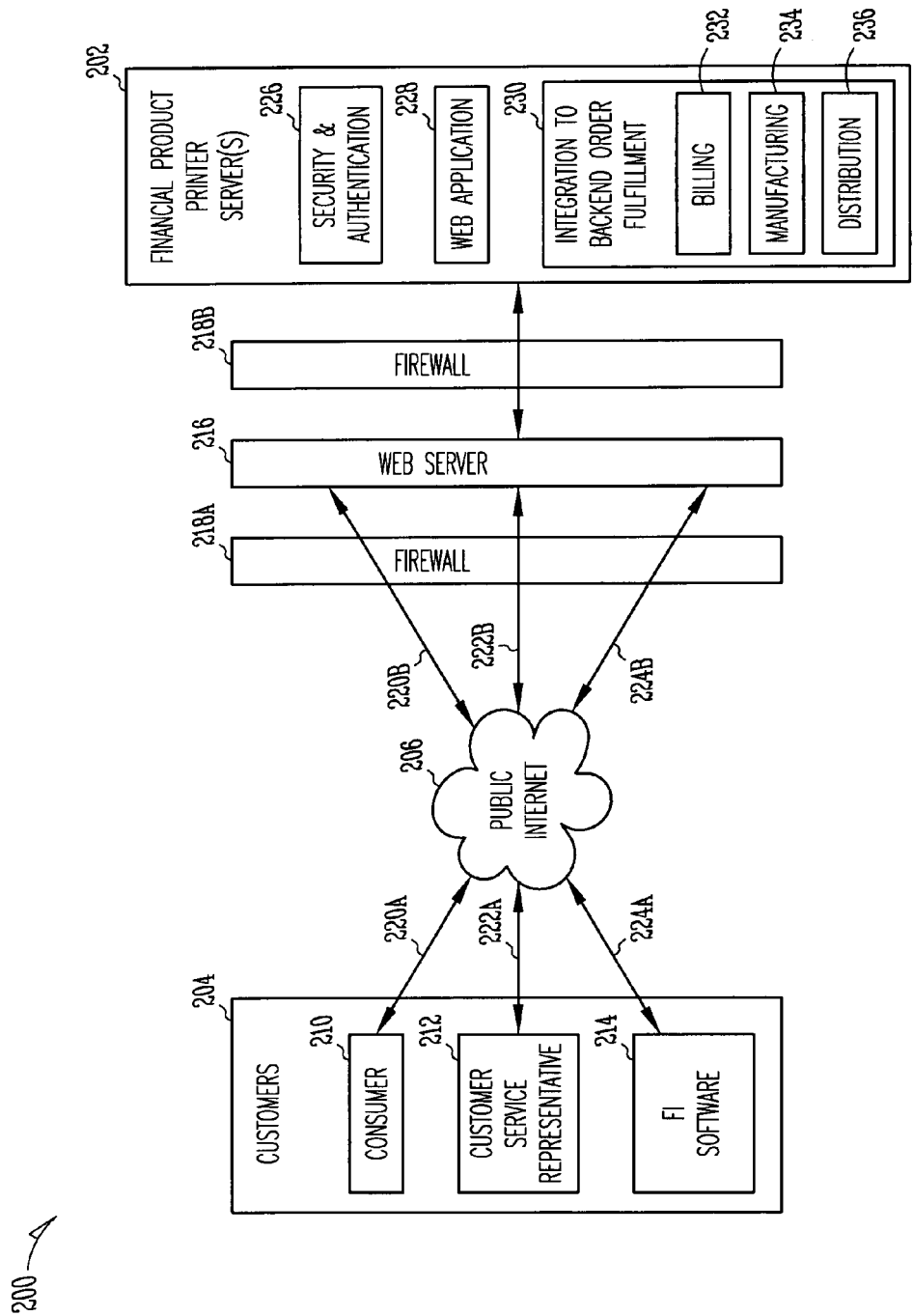
FIG. 2A illustrates one embodiment of the browser-based system for ordering financial products illustrated in FIG. 1.

FIG. 2A illustrates one embodiment of the browser-based system for ordering financial products illustrated in FIG. 1. The illustrated system 200 includes a server 202 at a first location and a number of browser-based clients 204 at other locations. The browser-based client(s) 204 represent financial product customers who place orders for personalized financial products. Examples of personalized financial products include, but are not limited to, checks, deposit slips, and endorsement stamps. The server 202 receives the financial product orders, and a financial product business (also referred to herein as a "financial product printer") fulfills the financial product orders.

Figure 2B:
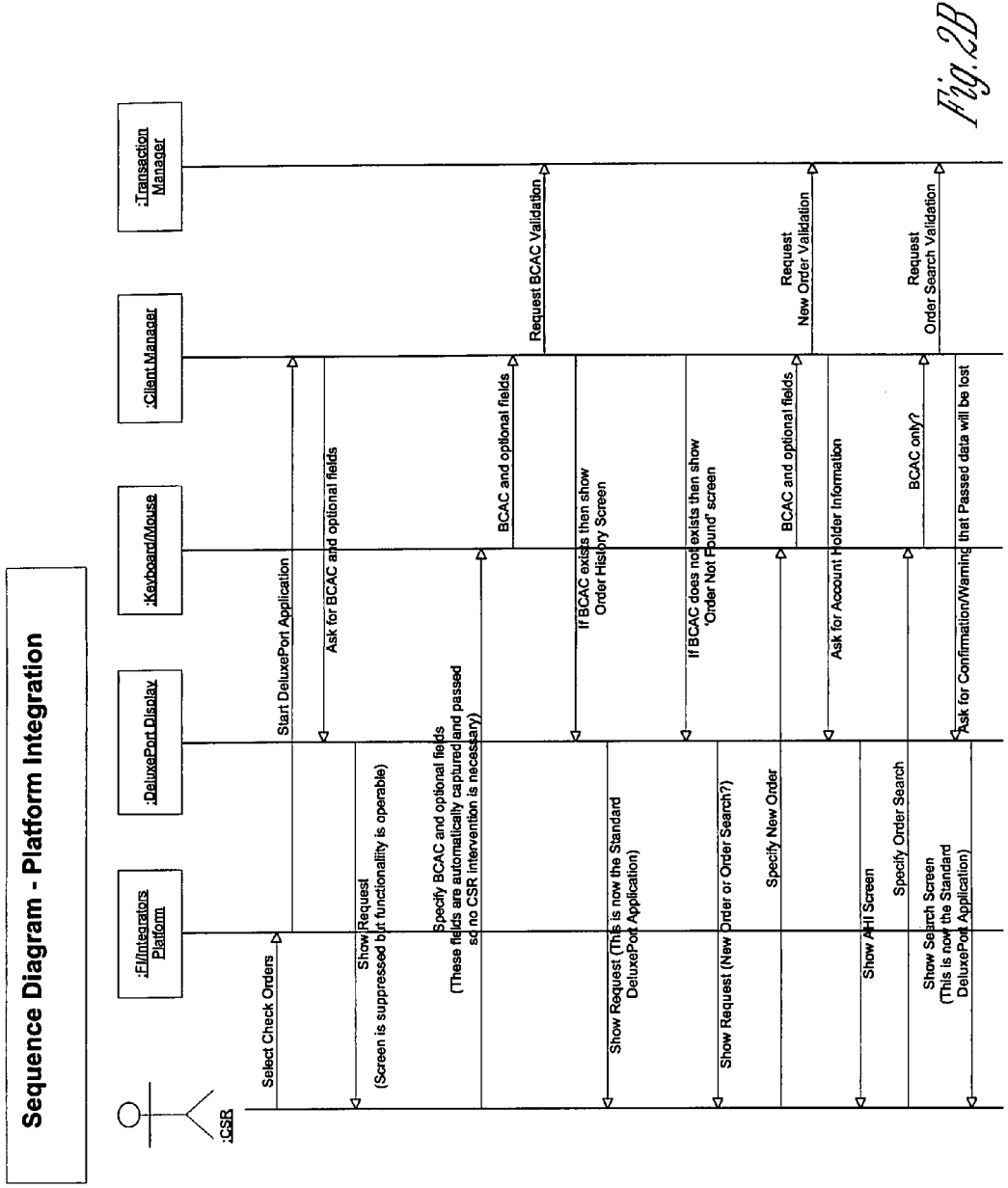
FIG. 2B illustrates a sequence diagram for platform integration, according to various embodiments of the present subject matter.

Examples of customers include, but are not limited to end-user consumers, represented at 210, customer service representatives 212 for financial institutions, and financial institution (FI) software 214 (such as that which may be used by larger financial institutions) which serves to validate a consumer 210 or customer service representative 212, and redirects a consumer or representative to the server 202 through a controlled access. In various embodiments, the controlled access involves the use of a server identifier and password, and a digital certificate. In various embodiments, the server 202 used to fulfill the financial products order issues a server certificate to the FI software, which is used by server 202 to authenticate the FI server/software. The server certificate permits secure communication to be conducted between a financial institution server and a server used to receive financial product orders. In various embodiments, the server certificate permits the redirection of the customer from the FI software. Server 204 includes a client piece to redirect through a public Internet cloud 206 to server 202. Thus, the FI software 214 is capable of providing a seamless transition from an FI website or other system to the financial product printer server(s) 202. FIG. 2B illustrates a sequence diagram for platform integration, according to various embodiments of the present subject matter.

One of ordinary skill in the art will understand, upon reading and comprehending this disclosure, that there can be a number of ways to integrate the platforms illustrated in FIG. 2A.

An end consumer 210 who desires to order checks (or other personalized financial product) is able to place an order directly through the public Internet network or through an FI Internet website (which authenticates the consumer). The consumer 210 also is able to order through a representative 212 at a FI, and the representative is able to place an order directly through the public Internet network or through an FI Intranet website (which authenticates the representative). Examples of financial institutions include, but are not limited to, banks and credit unions.

In one embodiment, the customers 204 communicate with a web server 216 through a public internet cloud 206 using a browser interface. The web server 216 communicates with server(s) 202 at a financial product printer to fulfill product orders. In one embodiment, firewall(s), illustrated as 218A and 218B, provide security for the communications. In one embodiment, the consumer 210 communicates with the web server 216 via lines 220A and 220B using HTTPS. In one embodiment, the customer service representative 212 communicates with the web server 216 via lines 222A and 222B using HTTPS with parameters. In one embodiment, the FI software 214 communicates with the web server 216 via lines 224A and 224B using XML over HTTPS.

According to various embodiments, the financial product printer server(s) 202 includes various modules or components. In one embodiment, the server 202 includes a security and authentication module 226 for identifying a customer ordering the financial products, and providing secure communication between the customer 204 and the server 202. In one embodiment, the server 202 includes a web application module 228 for controlling the functionality of the browser interface provided on the web server 216. In one embodiment, the server 202 includes an order fulfillment module for integrating the web server to a legacy back end for billing 232, manufacturing 234 and distribution 236.

Figure 3:
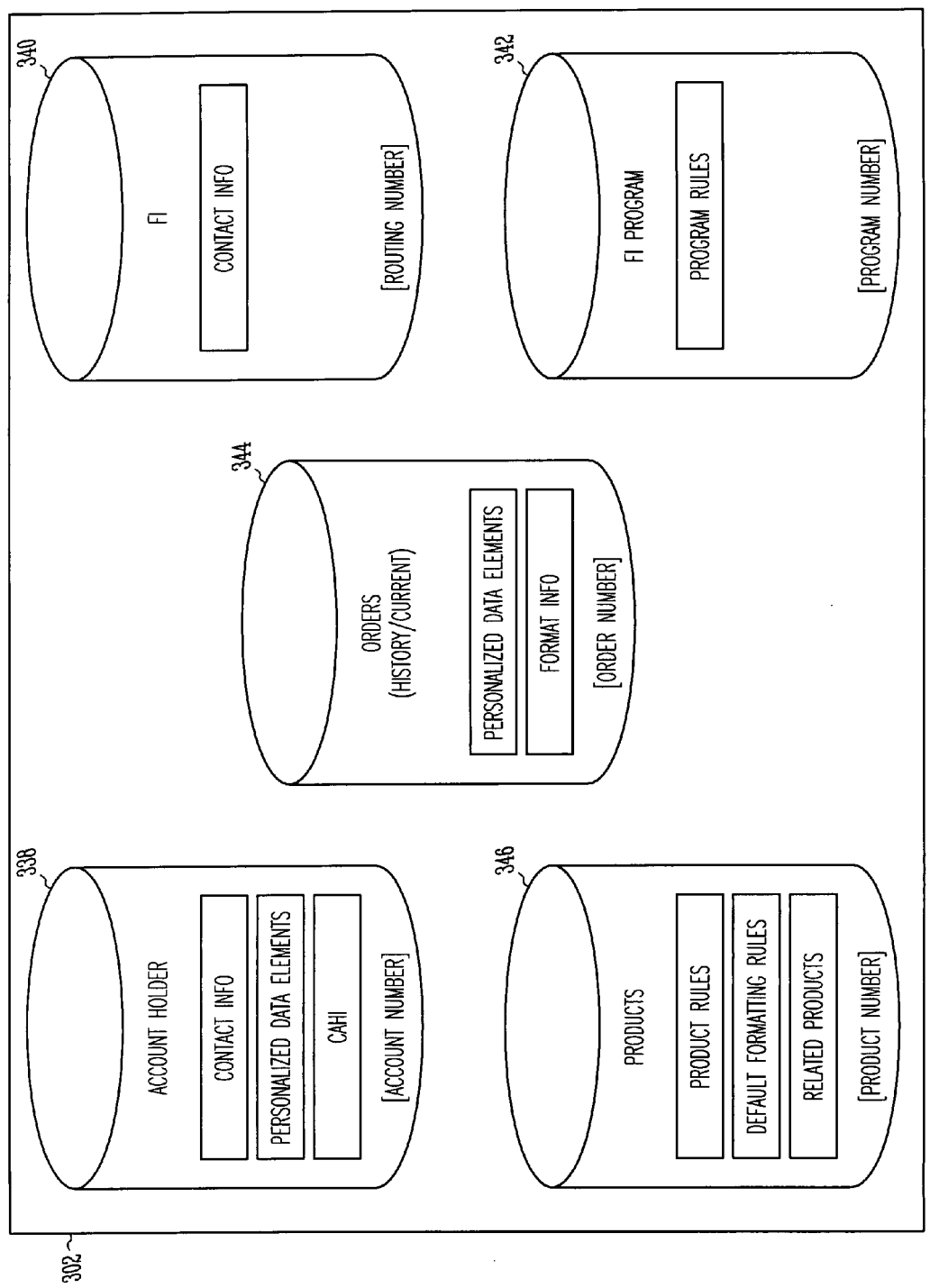
FIG. 3 illustrates one embodiment of a server for the system of FIG. 1.

FIG. 3 illustrates one embodiment of a server for the system of FIG. 1. The illustrated server 302 include a number of components, which include databases, for performing various processes for the system. In one embodiment, the server 302 includes an account holder component 338, a financial institution (FI) component 340, a financial institution (FI) program component 342, an orders component 344 and a products component 346. Upon reading and comprehending the remainder of this disclosure, one of ordinary skill in the art will understand the functions of these components, which are appropriately associated with each other to perform the various processes for the system.

The account holder component 338 maintains a plurality of account holder records. Each account holder record includes an account number to identify the record, contact information for the account holder, and personalization elements (other data fields).

In one embodiment, for example, each account holder record is able to contain data for the following fields (personalization elements) as provided in Table 1.

TABLE 1

| | |
|---|---|
| Person 1 & 2 Prefix. | The prefix for the name of the first or second signer on the customer account that is printed on a check or personalized product. For example, Mr., Mrs. , Dr. |
| Person 1 & 2 First Name. | The first names of the signer(s) on the account. |

TABLE 1-continued

| | |
|---|---|
| Person 1 & 2 Middle. | The middle initial or name of the signer(s) on the account. |
| Person 1 & 2 Last. | The last names of the signer(s) on the account. |
| Person 1 & 2 Suffix. | The suffix of the signer(s) on the account. For example, Jr., Sr., PhD., III. |
| Person 1 & 2 Driver License | The number of the driver's license of the signer(s) on the customer account. Customer able to insert formatting such as hyphens. |
| Person 1 & 2 SSN. | The social security number for the first or second signer on the customer account. Customer able to insert formatting such as hyphens. |
| Person 1 & 2 Phone 1. | The first telephone number for the first or second signer on the customer account Typically the work phone. Customer able to insert formatting such as hyphens. |
| Person 1 & 2 Extension. | The extension for the telephone number listed as Phone 1 for Signer 1 or Signer 2. The work phone extension. Customer able to insert formatting such as hyphens. |
| Person 1 & 2 Phone 2. | The second telephone number for signer(s). Customer able to insert formatting such as hyphens. |
| Business Name. | The business name of the customer account if this is a business account and the customer chooses to have this imprinted on the product. |
| Address 1. | The first line of the address that should be imprinted on the product. |
| Address 2. | The second line of the address that should be imprinted on the product. |
| City. | The city that should be imprinted on the product. |
| Zip/Postal. | The zip or postal code that should be imprinted on the product. Customer able to insert formatting such as hyphens, and able to use alphanumeric characters. |
| Country. | The country that should be imprinted on the product. |
| Misc 1. | Any other text that the customer chooses to have imprinted on the product. For example: "Household account" |
| Misc 2. | Any other text that the customer chooses to have imprinted on the product. For example: "Household account". |
| Account Open Date. | The month and year the customer opened the account at the FI. |

In one embodiment, the account holder component 338 maintains current account holder information (CAHI). The CAHI is updated with the latest account holder information provided for the last personalized order for the account holder (regardless of the product ordered). In one embodiment, the account holder component 388 supports special characters in the personalization elements.

According to various embodiments, the personalization data is populated from third party databases. According to various embodiments, the personalization data is populated through an integration with an electronic funds system. According to various embodiments, the name and address data is validated through a third party service.

The financial institution (FI) component 340 maintains a plurality of FI records. Each FI record includes a routing number to identify the FI, and contact information.

The program component 342 maintains a plurality of program records that are associated with the FI records and the account holder records. Financial programs, for example, provide special benefits or offerings marketed to a group of account holders. Each program record a program identifier to identify the programs provided by the financial institutions, and the programs available to specific account holders. The program component maintains program rules for the program records. These program rules are enforced so that only eligible account holders are classified as being a member of a program, and to dynamically provide content that pertains to a member of the program.

The products component 346 provides a number of financial products available for order based on a client-selected account number, a client-selected routing number and a client-selected program identifier. Examples of financial products include, but are not limited to, personal checks, business checks, endorsement stamps, deposit slips, and other personalized financial products. In one embodiment, the products component 346 include default formatting rules for the financial products. In one embodiment, the products component 346 includes related products that are intended to be marked with other financial products.

The order component 344 is used to order a number of financial products that is associated with the client-selected account number and the client-selected routing number. In one embodiment, the order component 344 provides a proposed imprint to personalize an ordered financial product, and provides mechanism to modify the proposed imprint.

In one embodiment, the order component 344 includes an order history component for maintaining a number of previous financial product orders. In one embodiment, a current product order is populated with personalization elements from one of the previous financial product orders. In one embodiment, a current product order is formatted based on the format for one of the number of previous financial product orders.

In one embodiment, a current product order is populated with personalization elements from a current account holder information (CAHI) record associated with the client-selected account number. In one embodiment, a current product order is formatted based on a default format associated with the client-selected product identifier.

The program rules provided by the FI program component 342 dynamically drive content used by a consumer to order financial products for a client selected program record. For a given program in one embodiment, for example, the system provides a product price, product selection (and related product selection), shipping preferences, and enhancements tailored for the given program.

Figure 4:
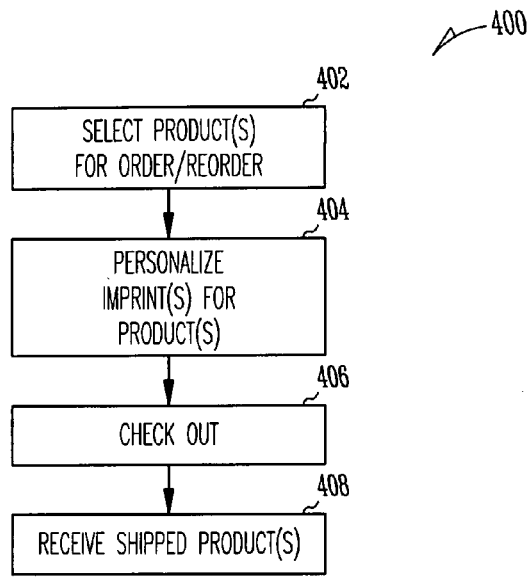
FIG. 4 illustrates one embodiment of a method for ordering financial products using the browser-based system of FIG. 1.

FIG. 4 illustrates one embodiment of a method for ordering financial products using the browser-based system of FIG. 1. A customer at a browser-based client performs this method to order financial products. In one embodiment of this method 400, a number of financial products are selected to be ordered or reordered at 402. At 404, imprints for the financial products are personalized for the account holder. At 406, a checkout procedure is perform to verify an order and to submit the order. At 408, the shipped personalized financial products are received by the customer.

Taken from the view point of a financial product printer, the method illustrated in FIG. 4 can be viewed as a method for fulfilling financial product orders. In this method, a number of user inputs for selecting a number of financial products is received through a browser interface. A number of imprints for the number of selected financial products is personalized. An order for the selected number of financial products is accepted and shipped.

Figure 5:
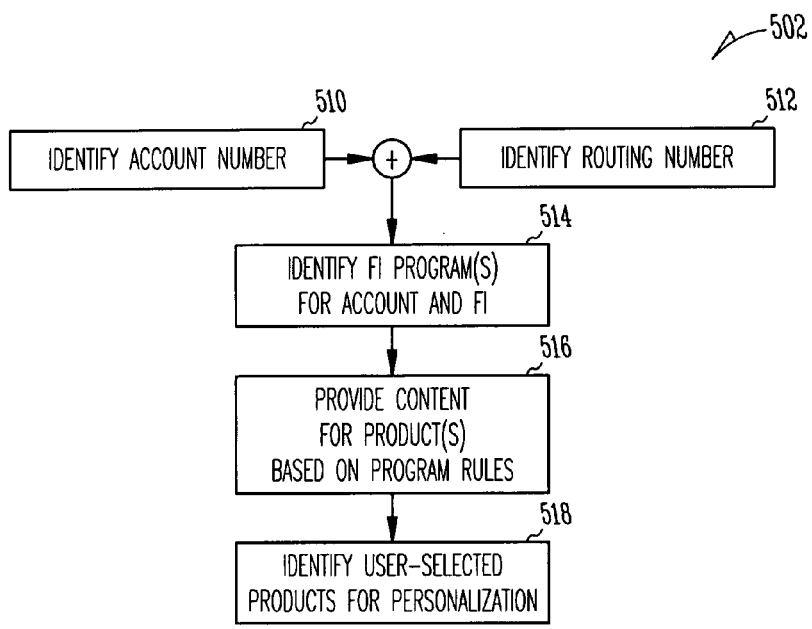
FIG. 5 illustrates one embodiment of a method for receiving a selected product as part of a method for fulfilling financial product orders.

FIG. 5 illustrates one embodiment of a method for receiving a selected product as part of a method for fulfilling financial product orders. In one embodiment, for example, this method 502 is performed when a customer selects product(s) at 402 in FIG. 4. An account number for an account holder is identified at 510, and a routing number for a financial institution (FI) is identified at 512. The routing number and the account number are used to identify a number of viable programs at 514. In one embodiment, program rules provide a customer (such as a representative or consumer) with a list of available products and/or services based on program rules. In one embodiment, the system provides a program list for a selected FI routing number, and an FI representative selects the appropriate program for the account from the list. In one embodiment, the system automatically identifies the program associated with the account number and the routing number based on previously provided information. At 516, the content used by the customer at the browser-based client to select financial products is dynamically provided based on program rules associated with a selected program. At 518, the customer selects one or more financial products for personalization. Financial products are personalized by, for example, providing personalized imprints.

Figure 6:
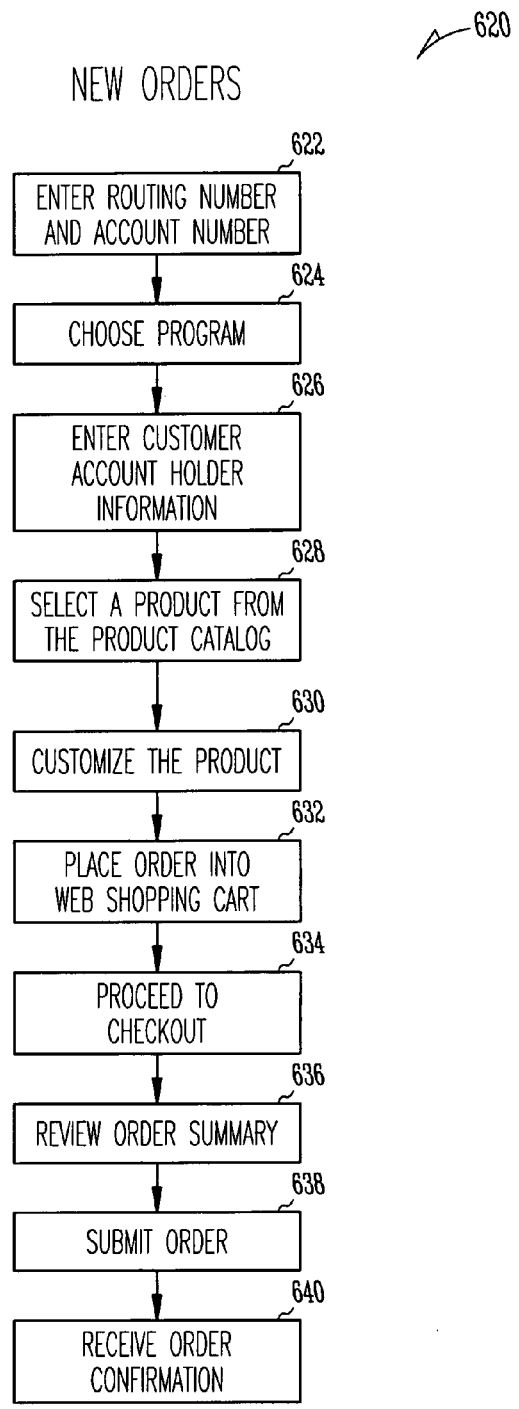
FIG. 6 illustrates one embodiment of a method for placing a new order for financial products using the browser-based system of FIG. 1.

FIG. 6 illustrates one embodiment of a method for placing a new order for financial products using the browser-based system of FIG. 1. In one embodiment, the illustrated method is performed by, for example, the customer at the browser-based client 102 in FIG. 1 when no other personalized orders have been placed for the account. In the illustrated embodiment of the method 620, a routing number and an account number are entered at 622. A program is chosen at 624. In one embodiment, the customer chooses the program from a list of viable program options based on the routing number and the account number. In one embodiment, the program is automatically chosen based on the routing number and the account number. For a new order, customer account holder information is entered at 626. At 628, a financial product is selected from a product catalog. The selected financial product is customized at 630, and is placed as an order into a web shopping cart at 632. At 634, a checkout is performed. An order summary is reviewed at 636, and an order is submitted at 638. An order confirmation is received at 640.

Figure 7:
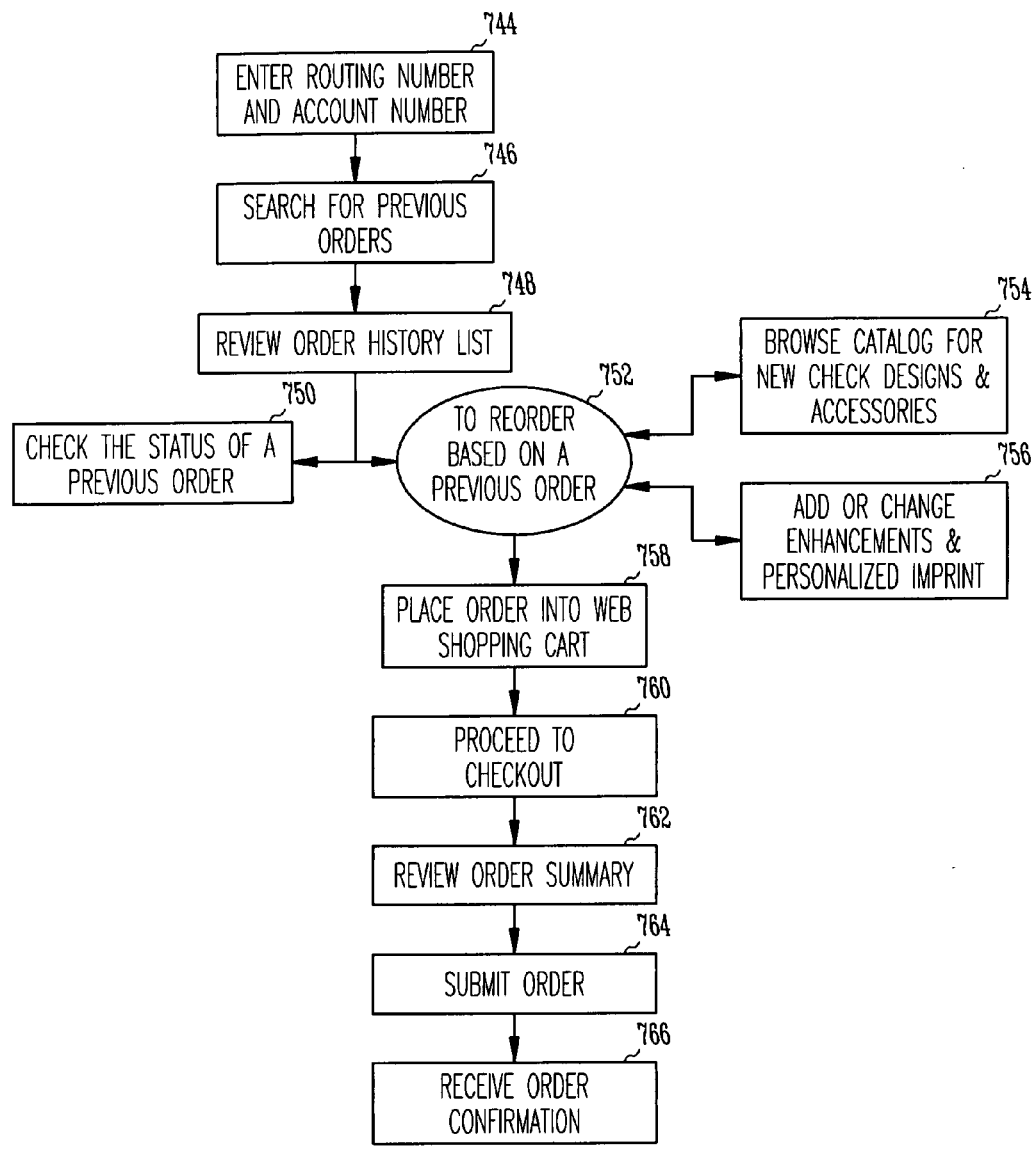
FIG. 7 illustrates one embodiment of a method for placing a reorder for financial products using the browser-based system of FIG. 1.

FIG. 7 illustrates one embodiment of a method for placing a reorder for financial products using the browser-based system of FIG. 1. In one embodiment, the illustrated method is performed by, for example, the customer at the browser-based client 102 in FIG. 1 when previous orders have been placed for the account. In the illustrated embodiment of the method 742, a routing number and an account number is entered at 744. Previous orders are searched for at 746. An order history list (listing the previous orders for the account number) is reviewed at 748. In one embodiment, this list includes a status indicator. Thus, the status of a previous order is able to be checked at 750. At 752, a product previously ordered is capable of being reordered. In one embodiment, the product is capable of being reordered from the order history list that is reviewed at 748. At 754, a catalog, for example, is browsed for the purpose of selecting a different check design and/or accessories. At 756, enhancements and/or personalized imprints for the ordered product are added and/or changed. The order is placed into a web shopping cart at 758. At 760, a checkout is performed. An order summary is reviewed at 762, and an order is submitted at 764. An order confirmation is received at 766.

Figure 8:
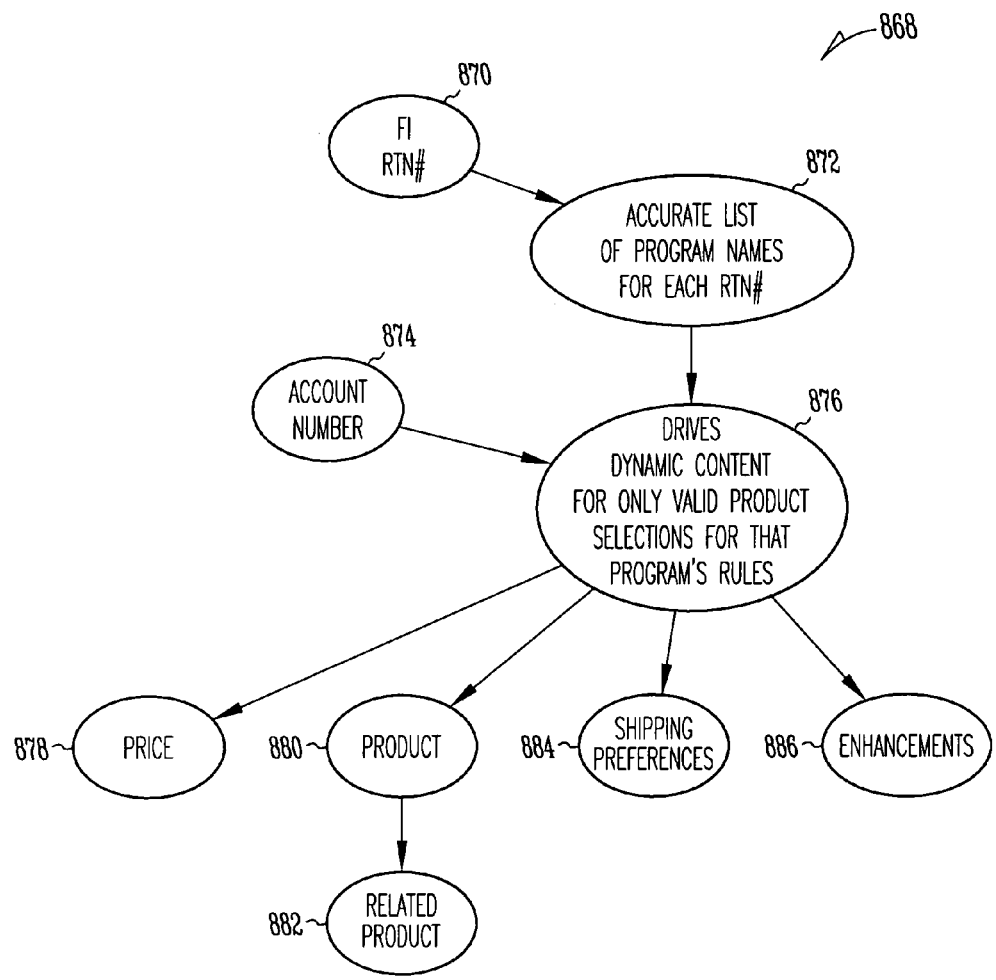
FIG. 8 illustrates one embodiment for providing dynamic content for valid product selections based on program rules.

FIG. 8 illustrates one embodiment for providing dynamic content for valid product selections based on program rules. In the embodiment illustrated generally at 868, a routing number for a financial institution (FI) is provided by the customer at 870. At 872, the programs associated with the routing number is identified. An accurate list of these programs is capable of being provided for an FI representative, for example, to use in selecting the program for the account. An account number for the FI is provided by the customer at 874. At 876, program rules are applied based on the routing number (and the account number in various embodiments) to drive the dynamic content for only valid product selections. Examples of the dynamically driven content directed toward members of a program include, but are not limited to, prices 878, available products 880, related products 882 as part of a marketing campaign for example, shipping preferences 884 and enhancements 886.

Figure 9:
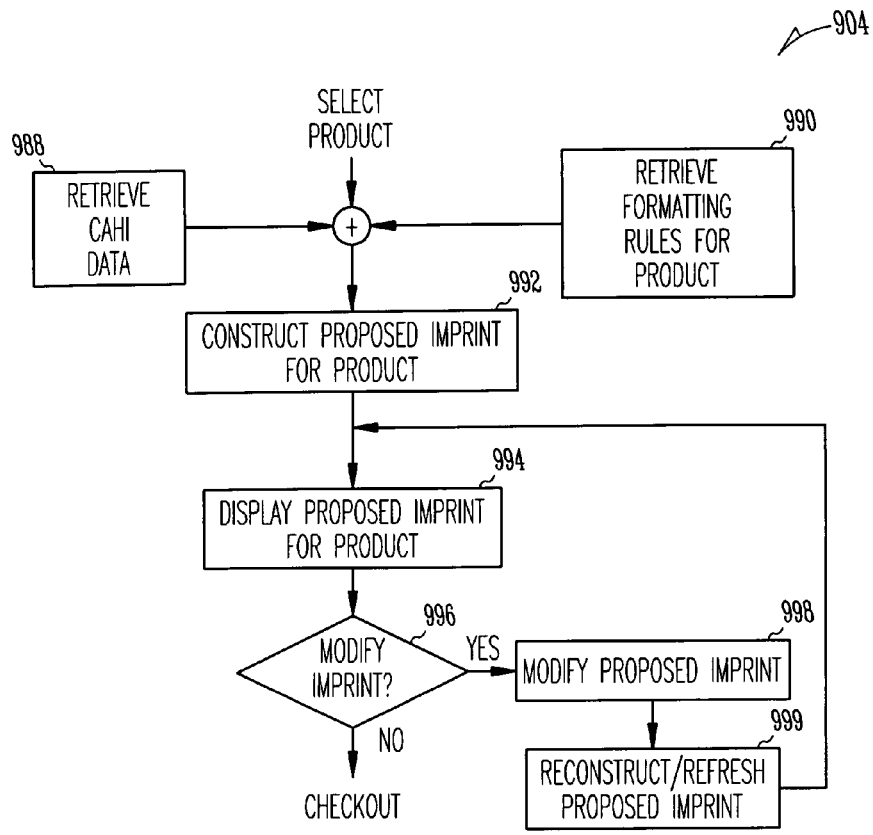
FIG. 9 illustrates one embodiment of a method for providing personalized imprints as part of a method for fulfilling financial product orders.

FIG. 9 illustrates one embodiment of a method for providing personalized imprints as part of a method for fulfilling financial product orders. In one embodiment, for example, this method 904 is performed when a customer is personalizing imprint(s) for the selected product(s) at 404 in FIG. 4. In the illustrated embodiment, current account holder information (CAHI) data is retrieved at 988, and formatting rules for the selected product are retrieved at 990. A proposed imprint for the product is constructed at 992 based on the retrieved CAHI data and formatting rules for the product. The various personalization elements contained within the CAHI data are arranged according to the formatting rules. At 994, the proposed imprint for the selected product is displayed for review by the customer. The customer reviews the imprint, and indicates whether to modify the imprint. At 996, the system detects the customer-provided indication. If the imprint is not to be modified, the process proceeds to the checkout process. If the imprint is to be modified, the proposed imprint is modified at 998, and is reconstructed or refreshed at 999. The process returns to 994 to display the refreshed imprint for review by the customer.

Figure 10:
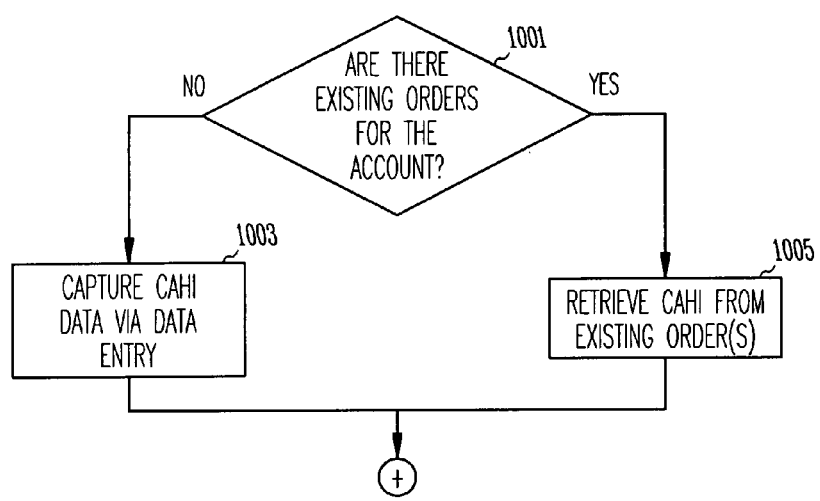
FIG. 10 illustrates one embodiment of a method for retrieving current account holder information (CAHI) as provided in FIG. 9.

FIG. 10 illustrates one embodiment of a method 1088 for retrieving current account holder information (CAHI) as provided at 988 in FIG. 9. At 1001, it is determined whether there are existing orders for the account. One example for determining whether there are existing orders for the account is provided at 746 in FIG. 7, which illustrates a search for previous orders. If there are no previous orders for the account, CAHI data is captured at 1003 via data entry. One example for capturing CAHI data via data entry is provided at 626 in FIG. 6, which illustrates account holder information being entered for new orders.

Figure 11:
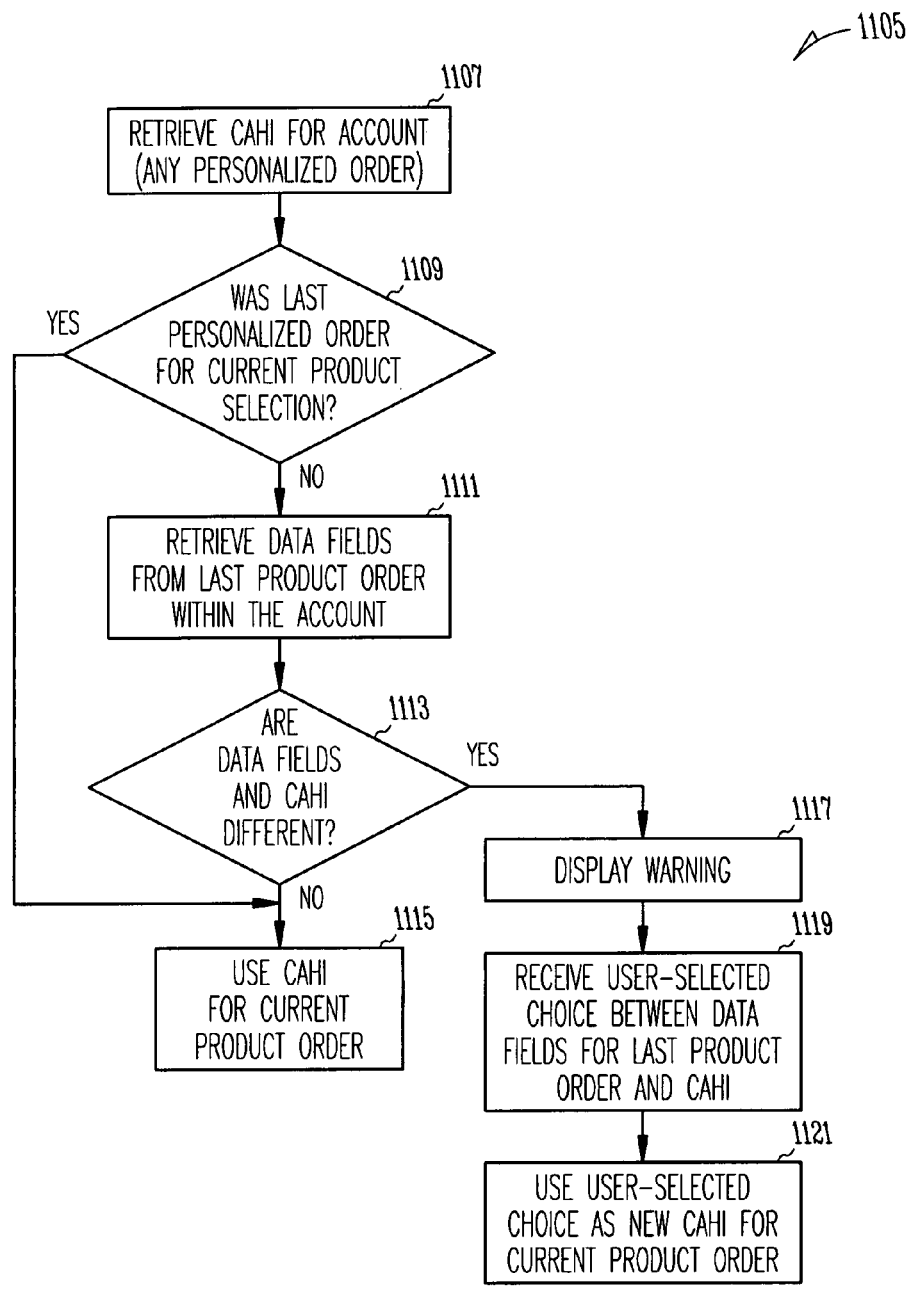
FIG. 11 illustrates one embodiment of a method for retrieving current account holder information (CAHI) from existing order(s) as provided in FIG. 10.

FIG. 11 illustrates one embodiment of a method 1105 for retrieving current account holder information (CAHI) from existing order(s) as provided at 1005 in FIG. 10. At 1107, CAHI data for the account is retrieved from the last personalized order. This CAHI data is capable of being obtained from any previous personalized order, and is not dependent on the product ordered. At 1109, it is determined whether the last personalized order was for the product currently-selected for personalization. Upon determining that the last personalized order was for the product currently-selected for personalization, the process proceeds to 1115 where the CAHI data is used to personalize the product for the current product order. Upon determining that the last personalized order was not for the product currently-selected for personalization, the process proceeds to 1111 where data fields (functioning as personalization elements) are retrieved from the last product order for the product currently-selected for personalization.

At 1113, it is determined whether the data fields for the last order for the currently-selected product and the CAHI data are different. Upon determining that the data fields and the CAHI data are not different, the process proceeds to 1115 where the CAHI data is used to personalize the product for the current product order. Upon determining that the data fields and the CAHI data (which is the most recent personalization data on record) are different, the process proceeds to 1117. At 1117, a warning is displayed to the consumer that indicating that the data fields for the last order for the currently-selected product and the CAHI data are different. The consumer selects to use the data field for the last order for the currently-selected product or the CAHI data. The choice is received at 1119, and is used as the new CAHI for the current product order at 1121. Various scenarios are provided in Table 2.

TABLE 2

| Scenario | Initial CAHI | Interim 'states' | Shopping Cart Products | Ending CAHI |
|---|---|---|---|---|
| Reorder most recent product, no changes to acct info<br>Click 'reorder' check box and add to cart<br>Click 'checkout' | Most recent order | | Most recent order | Most recent order |
| Reorder most recent product, change acct info (address change) on product details<br>Click product name to get to product details<br>Click 'Change Acct info' and change address<br>Click 'add to cart'<br>Click 'checkout' | Most recent order | 1. CAHI changes to new address after step 2 | New address | New address |
| New order, all products use initial data<br>Pick program and enter account information<br>Choose product from catalog<br>Configure product details and add to cart (if desired, add another product)<br>checkout | Initial data entry | | Initial data entry | Initial data entry |
| Reorder 2 products (1 most recent), all have same personalization data, no changes to acct info<br>Click product name to get to product details<br>Click 'add to cart'<br>Click 'order history'<br>Click second product name to get to product details<br>Click 'add to cart'<br>Click 'checkout' | Most recent order | | 1—Most recent order<br>2—Most recent order | Most recent order |
| Reorder 2 products (1 most recent), all have same personalization, initial change to acct info<br>On Order History, click 'change account info' and change address<br>Click 'reorder' next to most recent product and 'add to cart'<br>Choose "Most recent" option<br>From shopping cart, click 'order history'<br>Click 'reorder' next to second product and 'add to cart' | Most recent order | 1. CAHI changes to new address after step 1 | 1—new address<br>2—new address | New address |
| Choose "Most recent" option<br>From shopping cart, click 'checkout' | | | | |
| Reorder 1 older product, use old imprint<br>Click 'reorder' next to an older product and 'add to cart'<br>Choose "old information" option<br>click 'checkout' | Most recent order | | Old address | Most recent order |
| Reorder 1 older product, use new imprint<br>Click 'reorder' next to an older product and 'add to cart'<br>Choose "most recent" option<br>click 'checkout' | Most recent order | | Most recent order | Most recent order |
| Reorder 1 older product, use old imprint, add new product<br>Click 'reorder' next to an older product and 'add to cart'<br>Choose "old information" option<br>Click 'add new product' in shopping cart and choose product from catalog<br>Click 'add to cart' from new product details<br>Click 'checkout' | Most recent order | New product uses information from CAHI | 1—old address<br>2—most recent order | Most recent order |
| Reorder 1 older product, use old imprint, change old imprint, add new product<br>Click product name of older product<br>Choose 'use old information' option<br>On product details, Change Account Info and make changes<br>Add to cart<br>Navigate to product catalog and order a new product<br>From product details, add to cart<br>Checkout | Most recent order | CAHI changes after user updates 'old' address<br>New product used information from CAHI (which is the changed 'old' information) | 1—changed 'old' address<br>2—changed 'old' address | Changed 'old' address |
| Reorder 1 older product, use old imprint, reorder most recent product, add new product<br>Click product name of older product<br>Choose 'use old information' option<br>On product details, Change Account Info and make changes<br>Add to cart<br>Navigate to Order History, check 'reorder' next to most recent product and | Most recent order | CAHI changes after user updates 'old' address in step 1<br>Product 2 has its original address after step 6, but CAHI is not affected<br>New product used information from CAHI | 1—changed 'old' address<br>2—Most recent order<br>3—changed 'old' address | Changed 'old' address |

TABLE 2-continued

| Scenario | Initial CAHI | Interim 'states' | Shopping Cart Products | Ending CAHI |
|---|---|---|---|---|
| Add to Cart Choose "use old information" option (used to be most recent) Navigate to product catalog and order a new product From product details, add to cart Checkout | | (which is the changed 'old' information) | | |
| Reorder 1 product with most recent imprint, 1 product with old imprint, tweak data in old imprint Click 'reorder' next to most recent product and 'add to cart' Return to order history and click product name of 'older' product Choose "old information" option On Product Details page, click Change Account Info and make changes to 'old' information Click 'add to cart' Click 'checkout | Most recent order | CAHI changes after user updated 'old' address Product already in cart is not affected | 1—most recent order 2—changed 'old' | Changed 'old' address |
| Reorder 2 products with old imprints directly from order history Click 'reorder' next to 2 older products and 'add to cart' Choose "old information" for 1st product Choose "old information" for 2nd product Checkout | Most recent order | The 'which information do you want' screen appears twice | 1—'old' for product 1 2—'old' for product 2 | Most recent order |
| Reorder 2 products with old imprints, tweak data in 2nd old Click 'reorder' next to older product and 'add to cart' Choose "old information" Return to order history and click product name of a different 'older' product Choose "old Information" option On Product Details page, click Change Account Info and make changes to 'old' information Click 'add to cart' Checkout | Most recent order | CAHI changes after product 2 is updated 1st product is not impacted | 1—'old' for product 1 2—changed 'old' for product 2 | Change 'old' address for product 2 |
| New order 1 product, change imprint data on 2nd product Pick program and enter account information Choose product from catalog | Initial data entry | CAHI changes after step 5 | 1—original information 2—changed information | Changed information |

TABLE 2-continued

| Scenario | Initial CAHI | Interim 'states' | Shopping Cart Products | Ending CAHI |
|---|---|---|---|---|
| Configure product details and add to cart Navigate to product catalog and choose a different product On product details, choose 'Change Account Info' and make changes Add to cart checkout | | | | |

Figure 12:
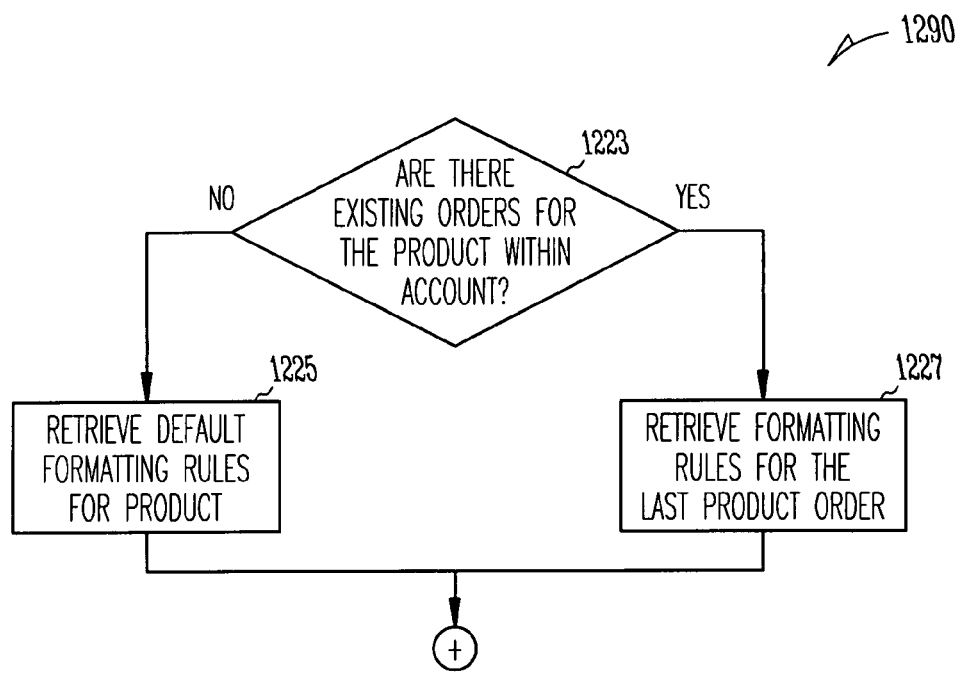
FIG. 12 illustrates one embodiment of a method for retrieving formatting rules for a product as provided in FIG. 9.

FIG. 12 illustrates one embodiment of a method 1290 for retrieving formatting rules for a product as provided at 990 in FIG. 9. At 1223, it is determined whether there are previous orders for the currently-selected product within the currently-selected account. If there are no previous orders for the currently-selected product in the currently-selected account, default formatting rules for the currently-selected product are retrieved at 1225 and used for the current order. If there are previous order for the currently-selected product in the currently-selected account, formatting rules for the last product order is retrieved at 1227 and used for the current order.

Figure 13:
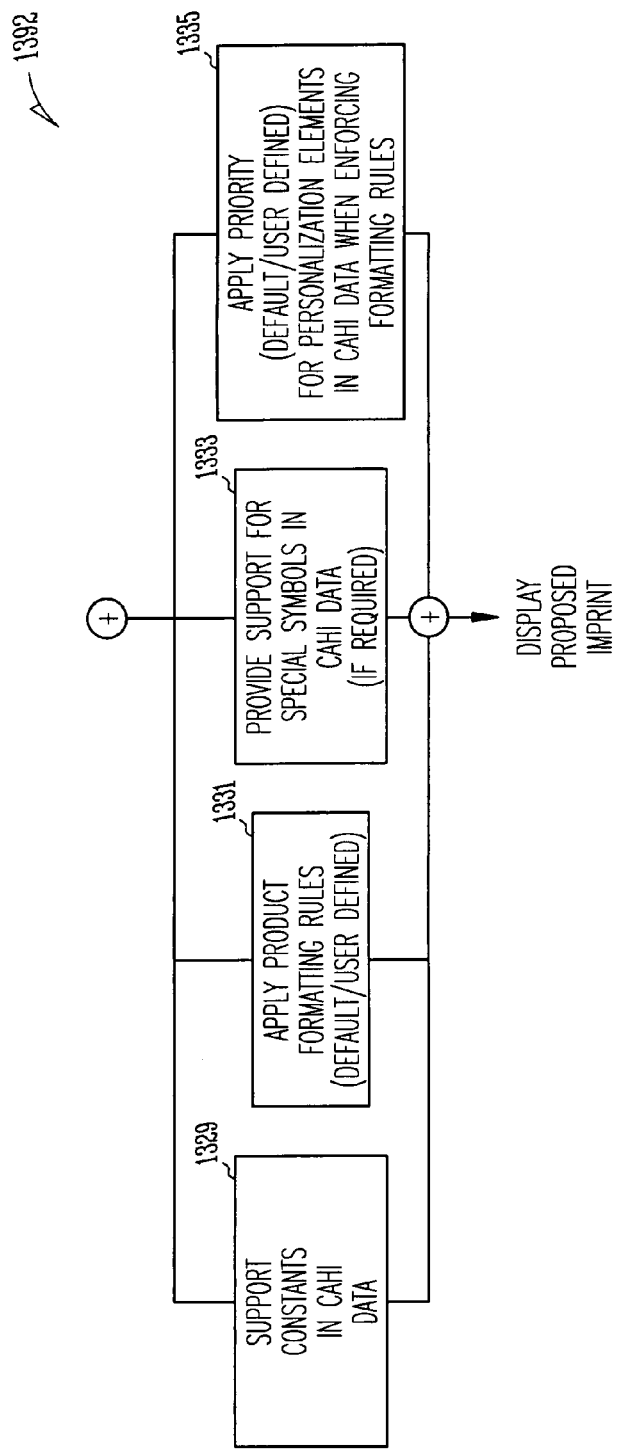
FIG. 13 illustrates one embodiment of a method for constructing a proposed imprint for a product as provided in FIG. 9.

FIG. 13 illustrates one embodiment of a method 1392 for constructing a proposed imprint for a product as provided at 992 in FIG. 9. At 1329, constants are supported in the CAHI data, if required. Table 3 provides examples of constants for a situational example in which the legacy back end for the financial product printer supports up to 10 constants.

TABLE 3

| | |
|---|---|
| PH | Phone |
| WK | Work |
| EXT | Extension |
| SSN | Social Security Number |
| Lic | License |
| Misc (5 others) | User defined (for example North Carolina uses something different than "LIC" To prefix license information) |

At 1331, product formatting rules are applied. In one embodiment, the product formatting rules are default product formatting rules. In one embodiment, the product formatting rules are customer-defined formatting rules. In one embodiment, a choice is provided to use default product formatting rules or customer-defined product formatting rules. The product-specific rules are enforced when the user defined formatting rules.

At 1333, support for special symbols in CAHI data is provided, if required. In one embodiment, special symbols are allowed for the following fields: First Name, Last Name, Business Name, Address Line 1, Address Line 2, Misc1, Misc2, and City. In one embodiment, special codes are used because not all keyboards have a means to otherwise provide these symbols. For example, an acute accent over the e in José Rodriguez would need to be supported like this Jose\046, Rodriguez. Another example, a tilde over the n in Cañon Dr. would need to be supported like this Can\042, on Dr. The special codes are hidden from the customers or users and are not entered by typing "/042", for example. The user interface allows the user to choose characters that are not typically represented on a standard PC keyboard. In one embodiment, a translation routine converts the symbols into standard symbols recognized by HTML at the browser-based client.

In one embodiment, the following special symbols are supported with associated code, as provided in Table 4.

TABLE 4

| Special Character | Supporting Code |
|---|---|
| "acute accent" (´ example ú) | code \046 |
| "dieresis" (¨ example ü) | code \041 |
| "tilde" (~ example ã) | code \042 |
| "cedilla" (example ç) | code \048 |
| "grave accent" (` example ù) | code \047 |
| "circumflex" (^ example û)) | code \045 |
| "single over dot" (° example å) | code \040 |
| "asterisk" (*) | code \062 |
| "copyright" (©) | code \095 |
| "number/pound sign" (#) | code \071 |
| "question mark" (?) | code \072 |
| "1/4" (¼) | code \050 |
| "3/4" (¾) | code \051 |
| "at sign" (@) | code \065 |
| "dollar sign" ($) | code \066 |
| "percent sign" (%) | code \068 |
| "semi colon" (;) | code \069 |
| "cent sign" (¢) | code \067 |
| "exclamation point" (!) | code \073 |
| "plus sign" (+) | code \126 |
| "vertical bar" (\|) | code \086 |
| "1/2" (½) | code \161 |
| "left arrow" («) | code \144 |
| "right arrow" (») | code \143 |
| "equal sign" (=) | code \113 |

At 1335, assigned priority for personalization elements in CAHI data is applied as necessary when enforcing formatting rules. These priority rules identify the personalization elements to drop first if some elements need to be dropped to follow the formatting rules. In one embodiment, the products have default priority rules. In one embodiment, the priority rules for a product are customer-defined. In one embodiment, a choice is provided to use default priority rules or customer-defined priority rules.

With respect to priority, it is possible that a customer will collect more information than can fit in an imprint space limited to 6 lines by 45 lines. In one embodiment, the a default priority is provided. In one embodiment, a customer is able to modify the priorities as allowed by the formatting rules.

For example, in one embodiment, the personalization elements are prioritized as provided in the Table 5. The right hand side of the table presents the order lines as they would appear on the imprint. The left side of the table assigns a priority. In a situation in which all of the information is collected, only the lines assigned priority 1 through 6 would appear in the initial format.

TABLE 5

| Priority | Personalization elements |
|---|---|
| 1 | Prefix1 First1 Middle1 Last1 Suffix1 AccountOpen |
| 2 | Prefix2 First2 Middle2 Last2 Suffix2 |
| 3 | Business Name |
| 7 | Miscellaneous Text1 |
| 8 | Miscellaneous Text2 |
| 10 | LIC. License1 License2 |
| 11 | SSN. SSN1 SSN2 |
| 9 | WK. <###-###-####> EXT. <####> ###-###-#### EXT. <####> |
| 4 | Address Line1, Ph. Phone1 |
| 5 | Address Line2 |
| 6 | City State/Prov Zip/Postal |

A number of priority rules are applied according to various embodiments. Some of these rules are provided below as an illustration.

For example, if "Last1" and "Last2" are the same, then allow the user to indicate whether Name1 and Name2 should appear on one line or two lines. If the user indicates that the names should appear on one line, then the Name2 information is slid after Name1 information, omitting Last2. The user has an opportunity to customize for themselves. The account open date is slid to the end of line 1.

If "Last1" and "Last2" are not the same, then the proposed format is assembled with the names on two lines. The user is allowed to indicate whether the home phone should appear on the address line. If the user indicates that the home phone number should not appear on the same line as the address line, the phone number is printed between the SSN and WK. Lines, and the priority is after Misc. Text 2 and before Work phone. If the user indicates that the home phone number should appear on the address line, and there are two home phone numbers entered, both phone numbers are displayed on the address line. However, if the address line then exceeds 45 characters, the second phone number is dropped. If the address line still exceeds 45 characters, a warning is given to indicate that the phone number will be a separate line.

If a "field" of information is not provided within a line, then personalization data elements are slid to the left. For example, if no prefix is given, then the first name is slid to the first position. If a whole line of information is not provided, then the remaining lines are moved up as there are no blank lines within the imprint. If the name line exceeds 45 characters, then less important information is dropped off of the name until the information fits within 45 characters.

If "account opened" date is not provided, then the "account opened" data is disregarded first. Prefix information is dropped second, Middle name information is dropped third, and Suffix information is dropped fourth. If the name line still exceeds 45 characters and the user indicated that both names should appear on one line, then a warning is displayed that the 45 character limit is exceeded and the names will appear on two lines.

If the work phone number line exceeds 45 characters, then less important information is dropped off of the work phone information until the information fits within 45 characters. If the line exceeds 45 characters, the "EXT." constant is replaced with "X." as a first step If the line still exceeds 45 characters, the "X." constant is dropped as a second step. If the line still exceeds 45 characters, all extension information is dropped as a third step.

If address line 1 exceeds 45 characters then a message is presented to the user that "address line 1 exceeds 45 characters please move some information to address line 2". The proposed imprint is built from the six lines of highest priority. If less than six lines have been completed, the proposed imprint is built from all information included. If information must be "dropped" by the system, then a warning is displayed to the user that some of the information was left out of the proposed format due to the 6 line by 45 character limit. The user is allowed to customize the format.

Figure 14:
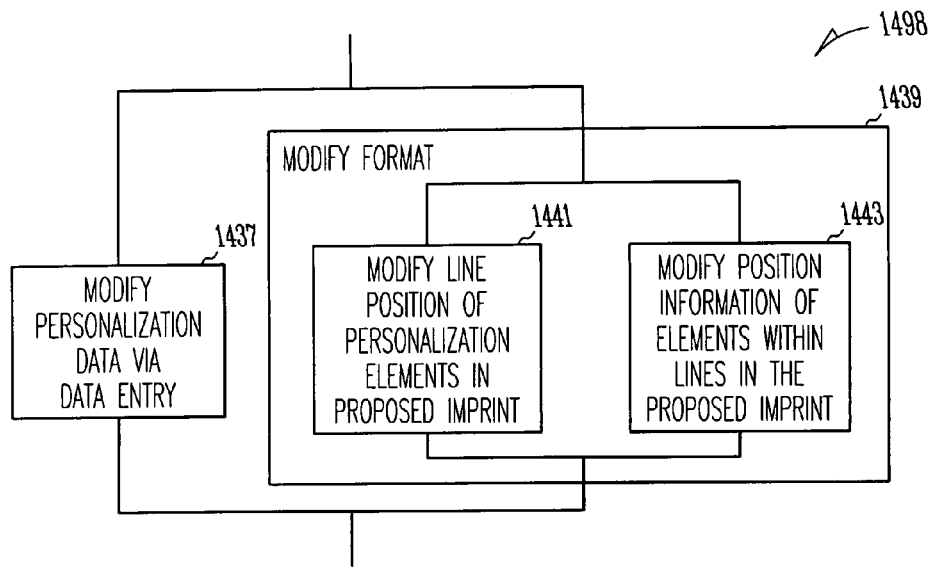
FIG. 14 illustrates one embodiment of a method for modifying a proposed imprint for a product as provided in FIG. 9.

FIG. 14 illustrates one embodiment of a method 1498 for modifying a proposed imprint for a product as provided at 948 in FIG. 9. At 1437, personalization data is modified via data entry. At 1439, the format of the personalization data is modified. At 1441, the format of the personalized data is modified by modifying the line position of personalization elements in a proposed imprint. At 1443, the format of the personalization data is modified by modifying position information of personalization elements positioned in the same line within the proposed imprint.

Figure 15:
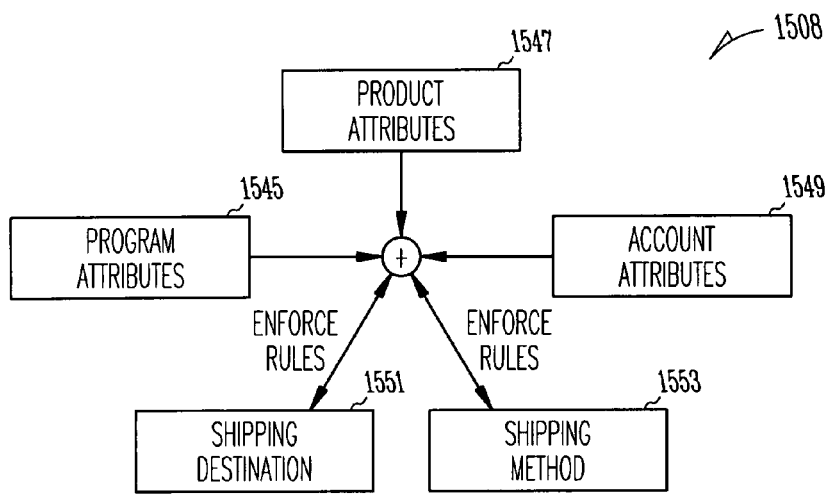
FIG. 15 illustrates one embodiment of a method for shipping products as part of a method for fulfilling financial product orders.

FIG. 15 illustrates one embodiment of a method for shipping products as part of a method for fulfilling financial product orders. According to the illustrated embodiment of the method 1508, program attributes 1545, product attributes 1547 and account attributes 1549 are received, and at least some of these attributes 1545, 1547 and 1549 are used to enforce rules regarding the shipping destination 1551, and to enforce rules regarding the shipping method 1553. For example, certain products are required to be shipped via specific shipping methods. In one embodiment, a chosen shipping method 1553 also is used to enforce a shipping destination 1551. For example, a delivery requires a street address, and not a P.O. Box address. In one embodiment, a chosen shipping destination 1551 also is used to enforce a shipping method 1553.

Figure 16:
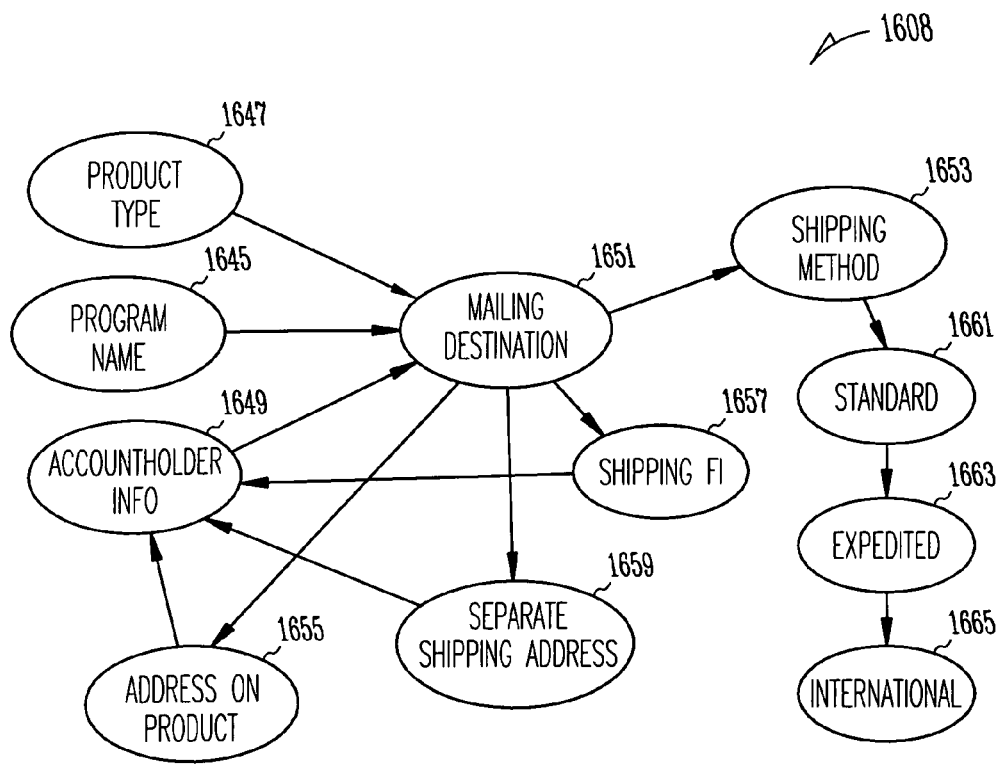
FIG. 16 illustrates one embodiment of a method for shipping products as part of a method for fulfilling financial product orders.

FIG. 16 illustrates one embodiment of a method for shipping products as part of a method for fulfilling financial product orders. According to the illustrated method 1608, the program 1645, the product type 1647, and the account holder information 1649 are used to enforce shipping rules regarding the mailing destination, and regarding the shipping method 1653. In various situations, for example, the shipping rules require that the financial products are shipped to the address on the product 1655, are shipped to the financial institution (FI) 1657, or are shipped to a separate shipping address 1659. The figure illustrates that these shipping destinations are stored as part of the account holder information. In various situations, for example, the shipping rules require that the financial products are shipped using a standard shipment 1661, an expedited shipment 1663, or an international shipment 1665.

In one embodiment, the present subject matter enforces business rules that the customer needs to be aware of in the order submission process that interact or are dependent on other order capture/submission elements. In one embodiment, rules validation is provided for major system rules.

In one embodiment, for example, carrier service levels are determined based on time of day, weight of package and the like. In one embodiment, for example, default carriers are determined based on quantity, product, and the like.

In one embodiment, there are a number of options for generating shipping label lines, including "Ship to Consumer" where the mailing label lines are created from the personalization on the order; "Ship to FI Branch Address" where the label lines are generated by back end files based on the branch address for that Routing Number/Branch combination on file, and "Ship to Special Address" where the user provides a separate mailing address (label) on the order at the time it was placed.

The term 'default' indicates when logic applies a preference to the Shipping Destination and/or Shipping Method so that the customer does not have to manually remember or understanding the intricate rules for shipping and mailing check orders. According to one embodiment, if business defaults are not followed, the orders route to manual or exception processing.

For example, the mailing method is set or defaulted to Standard/Regular for new orders. For existing orders, the previous mailing method is returned. In one embodiment, the mailing method is set or defaulted to Standard/Regular for reorders so as not to perpetuate more expensive delivery methods. For orders that request Express Delivery, The Shipping Address cannot be to a PO BOX for orders that request Express Deliver. This applies to both Address Line 1 or 2 in Personalization and to Special Shipping.

Some examples of special business rules applied to mailing methods are provided below. For example, if the Country Code is populated in either the personalization section or the special shipping screens is populated with other than "none" or "USA," then the Mailing Method defaults to International for both new orders and reorders. If the Previous Mailing Method was "international," the Business Rule maintains the International Mailing Method for reorders.

If the "ship to" field is set to "FI branch address," then the shipping method defaults to standard domestic. If the "ship to" field is set to Special address, then the value of the Special Shipping Address Country field is read to determine if the Mailing Method should default to International. If the country field is not blank, "US", "USA", "United States", or "United States of America", then the shipping method is automatically set to international delivery. A message is displayed to the user indicating that the "shipping method has been set to International delivery."

Some examples of business rules applied to determine whether or not a Shipping Destination is valid are provided below. If the user selects a "Ship to FI Branch Address", then no Shipping Label Lines are created in the front end application. In one embodiment, for example, the FI Branch address is provided by a back end processing.

If No Personalization Exists on the Order, then the product defaults to Ship To Special Address. If the Personalization Minimum Required fields do not exist on the order, the product defaults to Ship To Special Address. If the User Selects the Ship to Special Address as the Mailing Destination, the User is required to provide the complete address lines (Name, Address, City, State, Zip, Postal). If the User Selects the Ship to Special Address as the Mailing Destination, all fields that are 'entered,' including the ATTN line, persist on the Label Line Information.

On new orders, the Mailing Destination defaults to Ship To Consumer. On reorders, all shipping information is retrieved from the order history. For reorders, if the Mailing Destination on the previous order was Ship To FI, the Mailing Destination defaults to Ship To Consumer. For reorders, if the Mailing Destination on the previous order was Ship To Special Address, the Mailing Destination is taken from the Shipping Address Label lines in the Order History. For both new orders and reorders, a customer is able to edit the content of the Shipping Address Label lines.

FIG. 17 illustrates one embodiment of a screen display for the browser-based system of FIG. 1 used to search for an existing financial product order. One example for determining whether there are existing orders for the account is provided at 746 in FIG. 7, which illustrates a search for previous orders. A customer enters the routing number and account number in the space provided, and clicks on the Search button. If previous orders are found, the order history (e.g. FIG. 18) is displayed. If previous orders are not found, the customer enters program information (e.g. FIG. 19) and account holder information (e.g. FIG. 20).

FIG. 18 illustrates one embodiment of a screen display for the browser-based system of FIG. 1 used to review past orders and to reorder financial products. The illustrated screen display includes account information, program information, and the most recent imprint information based on the current account holder information (CAHI) data. If no changes are desired, the appropriate Reorder box for a desired product is checked and added to the cart. Selecting the Item Description field provides a detailed description of the selected item. The customer is able to make changes to a previous order and submit the changed order as a new order through the Item Description field. In the illustrated embodiment, the order history includes order dates, order numbers, ordered quantities, the order status, and the ship date for the previous orders. The illustrated embodiment of the screen display also includes a Order New Item button, which if clicked, displays screen(s) used to order a new financial product. The illustrated embodiment of the screen display also includes a Change Program button for changing the FI program associated with the account, and a Change Account Info button for changing personalization elements used to construct the displayed imprint.

Figure 19:
FIG. 19 illustrates one embodiment of a screen display for the browser-based system of FIG. 1 used to select an account holder's program.

FIG. 19 illustrates one embodiment of a screen display for the browser-based system of FIG. 1 used to select an account holder's program. The screen display is able to be used to enter a program for a new account or change a program for an existing account. A drop-down list identifies the viable programs for the current account number and routing number. In one embodiment, the program is automatically selected or identified for the account based on information provided by the financial institution (FI). Examples of FI programs include, but are not limited to, Standard, Select Banking, Better Banking, Collegiate, FIP, Executive, and Small Business Program. One of ordinary skill in the art will understand, upon reading and comprehending this disclosure, that the FI programs are dependent on the FI. That is, each FI has their own set of programs designed to market various products and services to different customer groups.

FIG. 20 illustrates one embodiment of a screen display for the browser-based system of FIG. 1 used to enter and/or review account holder information, including personalization elements for the account holder. The illustrated embodiment includes account information such as routing number, account number, branch number, department number and the like. The illustrated embodiment further includes personalization information. Each account record includes a number of fields to enter personal data such as name, license number and the like. These fields function as personalization elements that are incorporated and formatted into personalization imprints. The illustrated embodiment of the screen display includes a Change Program button which is selected to change the FI program (illustrated as a Standard Program) associated with the account. The illustrated embodiment of the screen display also includes an Insert Special Character button which is selected to view the Insert Special Character screen display illustrated in FIG. 21. Special characters are those characters that are not standard computer keyboard keys in the United States, but are used in foreign words and names. Examples of these characters are provided in FIG. 21.

FIG. 21 illustrates one embodiment of a screen display for the browser-based system of FIG. 1 used to insert special characters in personalization elements for the account holder. A pull down menu allows the customer to select a field in which to insert one of the special characters. These fields include, for example, Prefix 1, First Name 1, Last Name 1, Suffix 1, Prefix 2, First Name 2, Last Name 2, Middle 2, Business Name, Special Line 1, and Special Line 2. These fields function as personalization elements contained in the account holder information. According to various embodiments, special characters are capable of being inserted by the customer as the customer enters new account holder information and modified existing account holder information.

FIG. 22 illustrates one embodiment of a screen display for the browser-based system of FIG. 1 used to search for financial products in a product catalog. The illustrated embodiment of the screen display includes a product search area to allow the customer to search the catalog by product code or by program, a default product area, and category headings for ordering various other personalized financial products such as Checks, Deposit Tickets, Special Account Type Products, Covers, Stamps and Accessories.

FIG. 23 illustrates one embodiment of a screen display for the browser-based system of FIG. 1 used to search for products in a product catalog when the personal checks link is selected in FIG. 22. The illustrated embodiment of the screen display includes a product search area to allow the customer to search the catalog by product code or by program, a default check product area, a recommended design area, and check category headings for ordering various other personal check products such as Cartoon & Movies, Floral, etc.

Figure 24B:

FIGS. 24A and 24B illustrate one embodiment of a screen display for the browser-based system of FIG. 1 used to review and modify a personal check product. The illustrated embodiment of the screen display includes a product attributes area where the currently selected attributes are displayed. In one embodiment, the product attributes area includes a Change button for changing the product design (e.g. Antique), and a View Design button for viewing the currently-selected product design. The illustrated embodiment of the screen display includes an imprint area. In one embodiment, the imprint area displays the currently-selected personalized imprint as provided at 994 in FIG. 9, for example. In one embodiment, the imprint area includes a Change Account Info button. Clicking on the Change Account Info button displays Account Holder Information, such as that illustrated in FIG. 20, which is used to change personalization elements. Thus, the Change Account Info button allows a customer to change the personalization data for the imprint as illustrated at 1437 in FIG. 14, for example. In one embodiment, the imprint area includes a Change Imprint Format button. Clicking on the Change Imprint Format button displays FIG. 27, for example, which will be described below. Thus, the Change Imprint Format button allows a customer to change the format for the imprint as illustrated at 1439 in FIG. 14, for example. The illustrated embodiment of the screen display further includes an enhancements areas for selecting personalization enhancements such as lettering, symbols, monograms, messages, signature areas, shadow print, and cover design, for example.

Figure 25B:
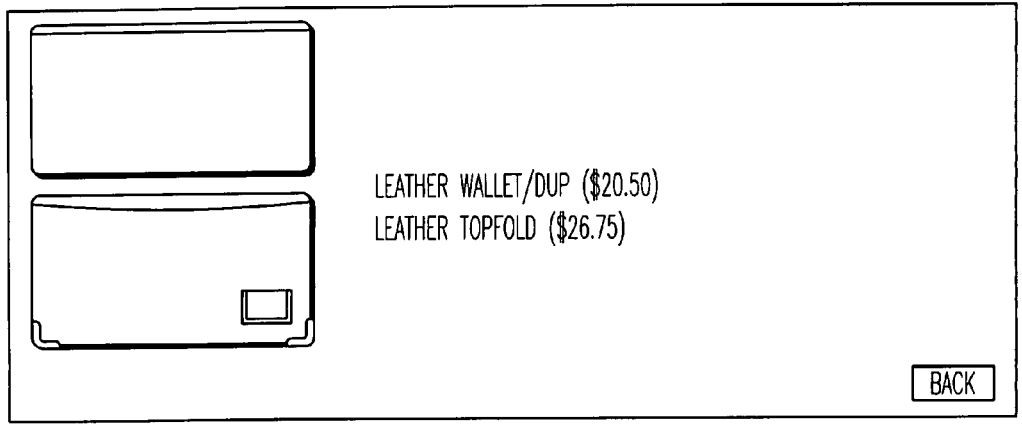

FIGS. 25A and 25B illustrate one embodiment of a screen display for the browser-based system of FIG. 1 used to review and change design details for a personal check product. The illustrated embodiment of the screen display includes an attributes area for viewing currently-selected design attributes for the product. In the illustrated embodiment, the attributes area includes a currently-selected design for the product, a currently selected binding style, and scenes for the product. The illustrated embodiment of the screen display includes an enhancements area for adding enhancements to the currently-selected design for the product. In one embodiment, for example, the enhancements that can be added include various symbols, monograms, lettering, messages, covers, and the like. The screen display illustrated in FIGS. 25A and 25B is capable of being used to add or change enhancements for a previous order, such as is generally illustrated at 756 in FIG. 7, for example.

Figure 26:
FIG. 26 illustrates one embodiment of a screen display for the browser-based system of FIG. 1 used to display an image of a personalized product.

FIG. 26 illustrates one embodiment of a screen display for the browser-based system of FIG. 1 used to display an image of a personalized product. The illustrated embodiment of the screen display includes a design information area for showing information regarding the currently-selected design and order information such as design description, a lettering description, an order quantity, and a starting number for checks. The illustrated embodiment of the screen display further includes an image area for displaying an image of the currently-selected product design.

FIG. 27 illustrates one embodiment of a screen display for the browser-based system of FIG. 1 used to review and change the format of a proposed personalized imprint. The illustrated embodiment of the screen display includes a current imprint area, a standard imprint lines area and a custom lines area. The currently-formatted imprint is displayed in the current imprint area. The standard imprint lines area includes a number of available standard personalization lines based on the fields populated in the account holder information. The custom lines area includes nonstandard personalization lines created by the customer using one or more of the personalization elements contained in the account holder information. Custom lines are added by selecting the Add Custom Line button, which displays the screen display shown in FIG. 28, for example. The personalization elements contained in the standard imprint lines and the custom lines are able to be modified by selecting the Change Account Info button. In one embodiment, each of the listed standard imprint lines and custom lines include a data entry field for a customer to enter a line number, with "1" representing the top line of the imprint, "2" representing the next line of the imprint, etc. If a number is not entered for a line, that line is not displayed in the imprint. Thus, a customer is able to change the format of the imprint by modifying the line position of the personalization elements as shown at 1441 in FIG. 14, for example. Selecting the Refresh Imprint button reconstructs the imprint and displays a refreshed imprint image in the current imprint area.

FIG. 28 illustrates one embodiment of a screen display for the browser-based system of FIG. 1 used to add custom lines to a personalized imprint. The illustrated embodiment of the screen display includes a number of available personalization elements as populated in the account holder information data. In the illustrated embodiment, the personalization elements are organized according to personal information for Person 1 of the account, personal information for Person 2 of the account, and business, address and special information for the account. Additionally, the illustrated embodiment includes an area listing available labels or constants available to be included in the custom line. A number of customer-specified labels (e.g. Custom 1) are also provided. In one embodiment, each of the listed personalization elements include a data entry field for a customer to enter a line number, with "1" representing the first (left-most) personalization element in the custom line, "2" representing the next personalization element in the custom line, etc. If a number is not entered for a personalization element, that element is not displayed in the custom line. Thus, a customer is able to change the format of a custom line, and thus the imprint by modifying the position information of personalization elements within lines as shown at 1443 in FIG. 14, for example. Selecting the Show Custom Line button reconstructs the custom line and displays a refreshed image of the custom line on the screen display. The reconstructed custom line is available to be included in a proposed current imprint, such as that provided in FIG. 27, for example.

FIG. 29 illustrates one embodiment of a screen display for the browser-based system of FIG. 1 used to select a lettering style for the personalized imprint. A customer is able to view various available lettering styles, and select a desired lettering style for the selected financial product. In one embodiment, lettering style options are provided as an enhancement for a financial product, as generally illustrated in the details screen display in FIGS. 24A and 24B.

FIG. 30 illustrates one embodiment of a screen display for the browser-based system of FIG. 1 used to select a monogram for the personalized imprint. A customer is able to view various available monogram styles, select a desired monogram style and select a desired letter for the monogram. In one embodiment, monograms and monogram style options are provided as an enhancement for a financial product, as generally illustrated in the details screen display in FIGS. 24A and 24B.

FIG. 31 illustrates one embodiment of a screen display for the browser-based system of FIG. 1 used to select a message for the personalized imprint. A customer is able to view various available messages. Available messages are grouped in message categories. In one embodiment, for example, available message categories include, but are not limited to, Gardening, Hobbies, Inspirational, and the like. In one embodiment, messages are provided as an enhancement for a financial product, as generally illustrated in the details screen display in FIGS. 24A and 24B.

FIG. 32 illustrates a shopping cart screen display for the browser-based system of FIG. 1 used to collect selected products for review prior to order. The shopping cart lists items ready to be ordered, along with order information such as price and quantity, for example. A customer is able to change, view or delete and item from the shopping cart. Selecting the Checkout button displays a screen display in which billing and shipping information is collected for new orders and/or reviewed for reorders.

Figure 33:
FIG. 33 illustrates one embodiment of a screen display for the browser-based system of FIG. 1 used to review and change design details for a deposit ticket product.

FIG. 33 illustrates one embodiment of a screen display for the browser-based system of FIG. 1 used to review and change design details for a deposit ticket product. The illustrated embodiment of the screen display includes a product attributes area where the currently-selected attributes are displayed. In one embodiment, the product attributes area includes a View Design button for viewing the currently-selected product design. The illustrated embodiment of the screen display includes an imprint area. In one embodiment, the imprint area displays the currently-selected personalized imprint as provided at 994 in FIG. 9, for example. In one embodiment, the imprint area includes a Change Account Info button. Clicking on the Change Account Info button displays Account Holder Information, such as that illustrated in FIG. 20, which is used to change personalization elements. Thus, the Change Account Info button allows a customer to change the personalization data for the imprint as illustrated at 1437 in FIG. 14, for example. In one embodiment, the imprint area includes a Change Imprint Format button. Clicking on the Change Imprint Format button displays FIG. 27, for example. Thus, the Change Imprint Format button allows a customer to change the format for the imprint as illustrated at 1439 in FIG. 14, for example.

Figure 34:
FIG. 34 illustrates one embodiment of a screen display for the browser-based system of FIG. 1 used to review and change design details for an endorsement stamp product.

FIG. 34 illustrates one embodiment of a screen display for the browser-based system of FIG. 1 used to review and change design details for an endorsement stamp product. The illustrated embodiment of the screen display includes a product attributes area where the currently-selected attributes are displayed. In one embodiment, the product attributes area includes a View Design button for viewing the currently-selected product design. The illustrated embodiment of the screen display includes an imprint area. In one embodiment, the imprint area displays the currently-selected personalized imprint as provided at 994 in FIG. 9, for example. In one embodiment, the imprint area includes a Change Account Info button. Clicking on the Change Name button displays Account Holder Information, such as that illustrated in FIG. 20, which is used to change personalization elements. Thus, the Change Account Info button allows a customer to change the personalization data for the imprint as illustrated at 1437 in FIG. 14, for example.

In one embodiment, for example, the endorsement stamp is printed with 7 lines of information as illustrated in Table 6.

TABLE 6

| Line | Personalization elements |
|---|---|
| 1 | PAY TO THE ORDER OF (fixed) |
| 2 | FI Name (fixed) |
| 3 | FI Address (fixed) |
| 4 | Routing Number (fixed) |
| 5 | FOR DEPOSIT ONLY (fixed) |
| 6 | Name (personalization) |
| 7 | Account Number (fixed) |

In the illustrated embodiment, the only customizable element of the endorsement stamp personalization is the name. If a business name is entered, the business name takes top priority. If no business name is entered, and only one name is entered, that name is printed. If no business name is entered, and two names are entered, if the user indicates that the names should appear on one line, then both names are printed. If no business name is entered, and two names are entered, if the user indicates that the names should not appear on one line, then only the first name is printed. The user is given the option to customize the name. A message is displayed that states "actual endorsement stamp imprint may vary based on the preferences of your Financial Institution".

FIG. 35 illustrates a checkout screen display for the browser-based system of FIG. 1 used to review and change order and shipping information prior to submission of the financial product order. The illustrated embodiment of the screen display includes an items ordered area used to change, view or remove an item, a billing area to review and identify who will be billed for the ordered financial product, and a shipping information to review and identify shipping information. In one embodiment, the shipping information includes an identity to whom the shipping is charged, a shipping method, and an identity to whom the product is shipped. In one embodiment, a customer is able to select a shipping destination option. In one embodiment, the available options are enforced by applied shipping rules based on account attributes, product attributes, and/or program attributes. According to various embodiments, the shipping destination options include shipping to the account holder, shipping to the financial institution, and/or shipping to a special shipping address.

In one embodiment, the priority and formatting rules are applied as generally illustrated by the example in Table 7.

TABLE 7

| Data Element | Person 1 | Person 2 |
|---|---|---|
| Prefix | Mr | Ms |
| First | James | Mary |
| Middle | C. | A. |
| Last | Morrison | Morrison |
| Suffix | | |
| Work Phone | 111-222-1234 | 444-555-8474 |
| Extension | 1234 | |
| Home Phone | 456-374-1837 | |
| License | M-383-393-393-394 | M-456-393-345-394 |

TABLE 7-continued

| Data Element | Person 1 | Person 2 |
|---|---|---|
| SSN | 321-32-8374 | 321-45-6787 |
| Open date | 09-78 | |
| Business Name | | |
| Address 1 | 1256 Sheridan ave. | |
| Address 2 | | |
| City | Anytown | |
| State | Mn | |
| ZIP | 55538-0000 | |
| Misc 1 | | |
| Misc 2 | | |
| Names on one line? | No | |
| Resulting check Format: | MR. JAMES C. MORRISON 09-78 Ms. MARY A. MORRISON LIC. -383-393-393-394 M-456-393-345-394 WK.111-222-1234 EXT.1234 444-555-8474 1256 SHERIDAN AVE., PH. 456-374-1837 ANYTOWN, MN 55538-0000 | |
| Resulting check Format (names on one line): | MR. JAMES C. OR MARY A. MORRISON 09-78 LIC. -0383-393-393-394 M-456-393-345-394 SSN. 321-32-8374 321-45-6787 WK.111-222-1234 EXT.1234 444-555-8474 1256 SHERIDAN AVE., PH. 456-374-1837 ANYTOWN, MN 55538-0000 | |
| Resulting deposit Format: | MR. JAMES C. MORRISON 09-78 MS. MARY A. MORRISON LIC. -383-393-393-394 M-456-393-345-394 WK.111-222-1234 EXT.1234 444-555-8474 1256 SHERIDAN AVE., PH. 456-374-1837 ANYTOWN, MN 55538-0000 | |
| Resulting endorsement stamp Format: | PAY TO THE ORDER OF YOUR FINANCIAL INSTITUTION YOUR CITY, STATE, 12345 ▶000067894◀ FOR DEPOSIT ONLY JAMES C. OR MARY A. MORRISON 12345678 | |

The financial instution (FI) may maintain data that can be used to populate data for an order. This information can be used to manage FI accounts and/or market to account holders, for example. Various embodiments of the present subject matter integrate the FI managed data and the order data to simplify the data entry process, and to maintain accurate data. The FI-provided data (third party) is cascaded to populate data in the order system. An order is initiated using cascading data through a third party application. The user logon is authenticated (e.g. FI-Name and FI-User-Role) based on a chosen security model and corresponding requirements.

Figure 36A:
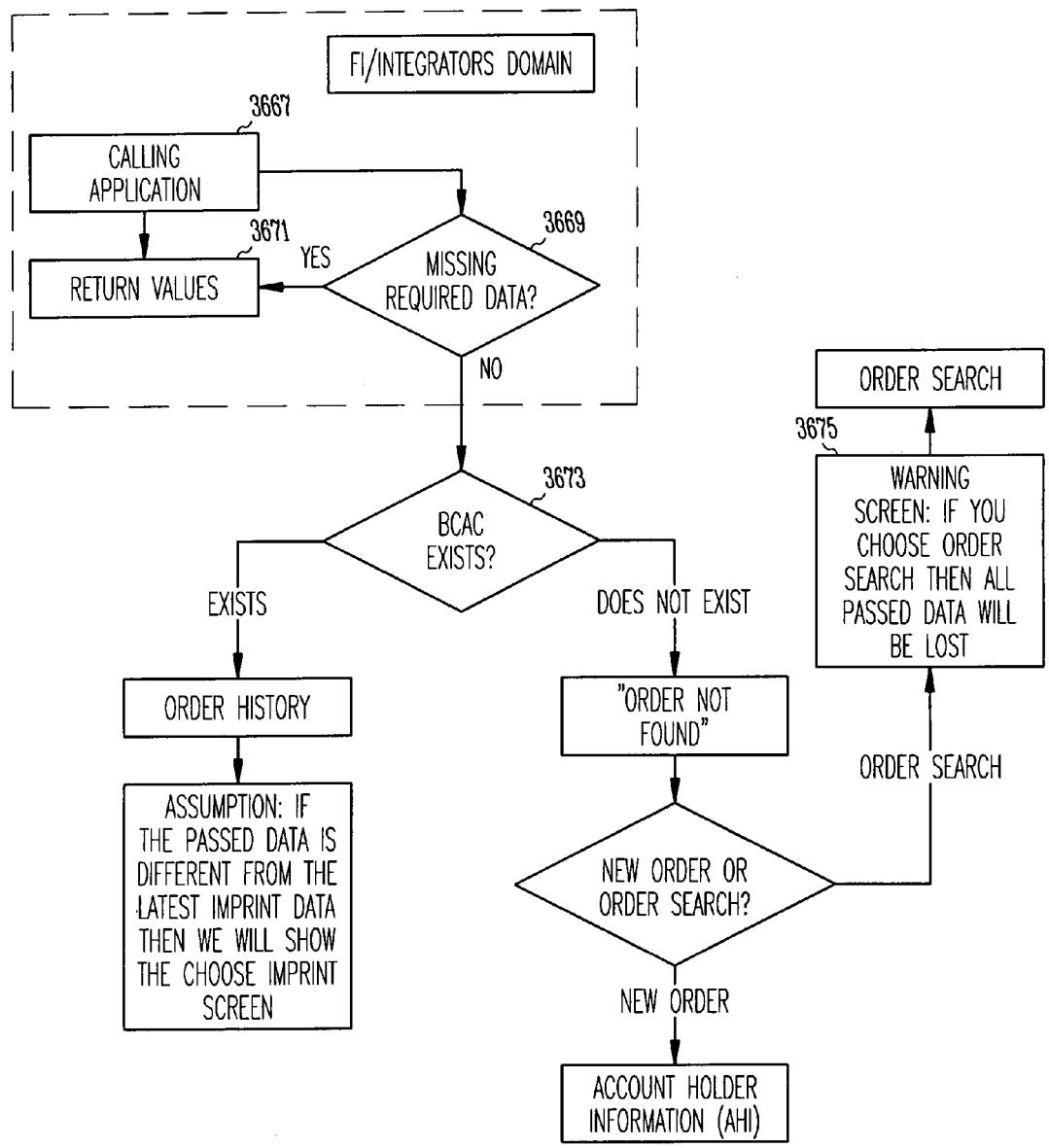
FIGS. 36A and 36B illustrate data cascading, according to various embodiments of the present subject matter.
Figure 36B:
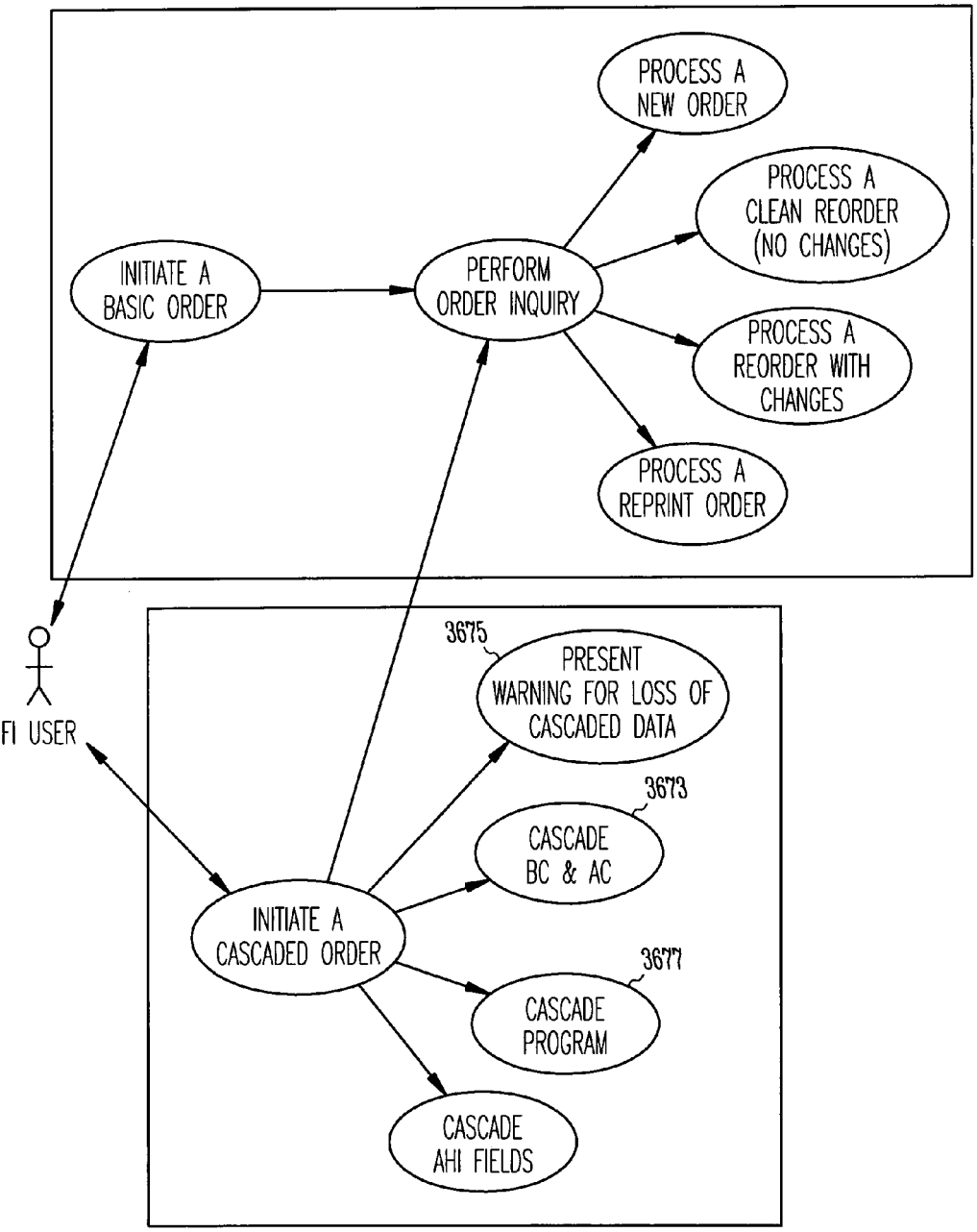

FIGS. 36A and 36B illustrate data cascading, according to various embodiments of the present subject matter. A user initiates an order through a third party integrater application 3667. The order system receives the data (such as XML and hereinafter referred to as XML data for this embodiment) from the third party integrater using data definitions and exchange as defined per the document type definitions (DTD). In various embodiments, a number of user inputs are received, and business rules are applied for use in selecting financial products. The order system converts/populates the customer information from the XML into the corresponding elements/objects defined and recognized by the system. Once this information is saved, the XML is removed from the user's session. As illustrated at 3669, the order system validates the presence of values associated with ordered-by/user identifier and a user-phone. If blank, as represented at 3671, the ordered-by/user identifier and user-phone are requested by the order system. At 3673, the order system validates cascaded bank code (BC) and account code (AC)

information. As generally illustrated in the figure, an order inquiry is initiated by the system after the XML data has been converted and the above-identified values have been validated. The order system validates cascaded program information, and the account holder/personalization information. In various embodiments, if a user requests an order search, a warning 3675 is provided to provide a notice that the cascaded information will be lost if a user chooses to proceed with the order search action.

In various embodiments, when a cascaded order is initiated, cascaded bank code (BC) and account code (AC) information 3673 are validated as follows. The order system validates the production bank code to ensure that the value is not empty, the value is numeric, and the value corresponds to a unique match in the list of production bank codes defined for the client. The order system validates the account number to ensure that the value is not empty, the value is numeric, and the value does not exceed the maximum length of twenty characters. An intermediate warning page is presented to the user to indicate the following choices: (1) continue to order search and input a valid routing number the and/or account number; and (2) exit the application. If the user proceeds to order search, the application preserves the cascaded information so that it is able to be used later once the bank code (BC) and the account code (AC) have been determined and the order inquiry has been performed.

In various embodiments, when a cascaded order is initiated, the program name 3677 is validated as follows. The order system validates the passed in program name to ensure that the program name is not empty (which indicates that the FI does not wish to have this value cascaded), and to ensure that the program name matches the program name for one of the programs defined for that FI. Valid program names are pre-populated for new orders, and overrides any previously existing value in reorders. If the program name in the cascaded data is blank, unrecognized, or otherwise invalid, users are directed to select a valid program for new orders, and the program name value from the order history is preserved for reorders.

In various embodiments, when a cascaded order is initiated, account holder information (AHI) 3679 is validated as follows. The order system validates the passed-in AHI fields to ensure that the fields presented in the form of selections (non-text) fields, such as state and country, are matched by the corresponding values, and to ensure that the values match either the code or the name defined for the state/country. Valid data is cascaded into the application. For new orders, the data is cascaded into the AHI screen. For reorders, data is cascaded into order history, where the personalization imprint is generated based on the cascaded data and the imprint sequence (which is not necessarily cascaded) is determined based on the most recent imprint in order history. If the order history does not include an imprint sequence, the imprint is generated based on default imprint generation rules.

As has been provided above, the present subject matter provides systems and methods for ordering and reordering personalized financial products such as checks. The present subject matter provides an interactive order process that presents viable personalization options to a user based on a number of rules for designing and ordering financial products and based on other user choices in the order process.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A browser-based financial products ordering system, comprising a server at a first location for communicating with a browser-based client at a second location, wherein the server includes a computer-readable medium encoded with a plurality of components and a processor configured to perform system processes, the plurality of components including:
   a financial institution (FI) component configured to maintain a plurality of FI records, wherein each FI record for the plurality of FI records includes a routing number;
   a products component configured to provide a number of financial products available for order; and
   a FI marketing program component configured to maintain a number of marketing program records for each FI record and identify marketing programs of an FI for selection by the client using the routing number for one of the plurality of FI records, wherein the marketing programs of the FI are for use by the FI to market to different customer groups, wherein the marketing program component is configured to drive dynamic content for the browser-based client using marketing program rules, wherein the dynamic content is related to financial product orders for a client-selected marketing program,
   wherein the plurality of components are configured to cooperate to receive a routing number through a browser interface, identify at least one available marketing program associated with the routing number, receive a client selection for a marketing program from the at least one available marketing program through the browser interface, and identify financial products available for order for the client-selected marketing program.

2. The system of claim 1, wherein the number of financial products includes personalized checks.

3. The system of claim 1, wherein the dynamic content includes products and related products for the client-selected program.

4. The system of claim 3, wherein the dynamic content includes product price for the client-selected program.

5. The system of claim 1, wherein the dynamic content includes shipping preferences for the client-selected program.

6. The system of claim 1, wherein the dynamic content includes enhancements for the client-selected program.

7. The system of claim 1, wherein:
   the plurality of components further include an account holder component configured to maintain a plurality of account holder records;
   each account holder record for the plurality of account holder records includes an account number;
   the program component is configured to further use the account number for one of the plurality of account holder records along with the routing number for one of the plurality of FI records to identify programs for selection by the client.

8. A browser-based financial products ordering system, comprising a server at a first location for communicating with a browser-based client at a second location, wherein the server includes a computer-readable medium encoded with a plurality of components and a processor configured to perform system processes, the plurality of components including:
- a financial institution (FI) component configured to maintain a plurality of FI records, wherein each FI record for the plurality of FI records includes a routing number;
- a product/service component configured to provide a number of products or services; and
- a FI marketing program component configured to maintain a number of marketing program records for each FI record and identify marketing programs of an FI for selection by the client using the routing number for one of the plurality of FI records, wherein the marketing programs of the FI are for use by the FI to market to different customer groups, wherein the marketing program component is configured to drive dynamic content for the client using marketing program rules, wherein the dynamic content is related to products or services for a client-selected marketing program,
- wherein the plurality of components are configured to cooperate to receive a routing number through a browser interface, identify at least one available marketing program associated with the routing number, receive a client selection for a marketing program from the at least one available marketing program through the browser interface, and identify financial products or services available for order for the client-selected marketing program.

9. The system of claim 8, wherein the product/service component is configured to provide a number of financial products, the server further includes:
- an account holder component configured to maintain a plurality of account holder records, wherein each account holder record for the plurality of account holder records includes an account number and a number of personalization elements; and
- a products component configured to provide a number of financial products available for order based on a client-selected account number, a client-selected routing number and a program identifier.

10. The system of claim 8, wherein the product/service component is configured to provide a number of financial products, and the dynamic content is related to financial product orders for a client-selected program record.

11. The system of claim 8, wherein the number of products or services includes personalized checks.

12. The system of claim 8, wherein the product/service component is configured to provide products and services.

13. The system of claim 8, wherein the program component is configured to drive dynamic content to market products and services to customer groups.

14. The system of claim 8, wherein the dynamic content includes a list of available financial products.

15. The system of claim 8, wherein the dynamic content includes a list of available financial services.

16. The system of claim 8, wherein the dynamic content includes a list of available financial products and financial services.

17. The system of claim 8, wherein:
- the plurality of components further include an account holder component configured to maintain a plurality of account holder records;
- each account holder record for the plurality of account holder records includes an account number; the program component is configured to further use the account number for one of the plurality of account holder records along with the routing number for one of the plurality of FI records to identify programs for selection by the client.

* * * * *